(12) United States Patent
Barnes

(10) Patent No.: US 7,329,343 B1
(45) Date of Patent: Feb. 12, 2008

(54) WATER TREATMENT BYPASS LOOPS HAVING OZONE AND CHLORINE GENERATORS

(76) Inventor: Ronald L. Barnes, 2823 Castle Pines Cir., Owens Crossroads, AL (US) 35763

(*) Notice: Subject to any disclaimer, the term of this patent is extended or adjusted under 35 U.S.C. 154(b) by 32 days.

(21) Appl. No.: 11/137,890

(22) Filed: May 26, 2005

Related U.S. Application Data

(63) Continuation-in-part of application No. 10/701,310, filed on Nov. 4, 2003, now Pat. No. 7,186,334, which is a continuation-in-part of application No. 10/636, (Continued)

(60) Provisional application No. 60/650,293, filed on Feb. 4, 2005, provisional application No. 60/640,957, filed on Dec. 31, 2004, provisional application No. 60/633,107, filed on Dec. 3, 2004.

(51) Int. Cl.
*E04H 4/12* (2006.01)
*C02F 1/461* (2006.01)
*C02F 1/78* (2006.01)

(52) U.S. Cl. ............... 210/167.1; 210/167.11; 210/167.12; 210/202; 210/416.2; 4/507; 204/660

(58) Field of Classification Search ........... 210/167.1, 210/202, 167.11, 167.12, 198.1, 206, 416.1, 210/416.2; 204/194, 660, 665; 4/507
See application file for complete search history.

(56) References Cited

U.S. PATENT DOCUMENTS

| 3,925,176 | A | * | 12/1975 | Okert | 205/701 |
| 4,171,256 | A | * | 10/1979 | Themy | 204/239 |
| 5,075,016 | A | * | 12/1991 | Barnes | 210/760 |
| 5,792,369 | A | * | 8/1998 | Johnson | 210/748 |
| 6,277,288 | B1 | * | 8/2001 | Gargas | 210/748 |
| 2003/0091469 | A1 | * | 5/2003 | Kondo et al. | 422/23 |
| 2003/0178373 | A1 | * | 9/2003 | Kondo et al. | 210/748 |

FOREIGN PATENT DOCUMENTS

| JP | 9-239368 | * | 9/1997 |
| JP | 11-192487 | * | 7/1999 |

* cited by examiner

*Primary Examiner*—Fred G. Prince
(74) *Attorney, Agent, or Firm*—Mark Clodfelter

(57) ABSTRACT

Water treatment bypass loops combining ozone and chlorine injection, and an adaptable clamp apparatus to support efficient retrofit installation of forward bypass loops (around filters) or reverse bypass loops (around pumps) and associated equipment are disclosed. Combined injection of ozone and chlorine exploits high oxidation potential of ozone to enhance oxidation effectiveness of chlorine while still retaining longer lived residual effectiveness of chlorine, particularly against biological and organic contaminants. A method for reducing costs of salt chlorine generation electrolysis cells and power supplies by using ozone to reduce deposit buildup on electrode plates is also disclosed, as is an apparatus for generating chlorine for use in water treatment in bathing facilities without requiring addition of sodium chloride or other halogen salts to water in a swimming pool or spa.

15 Claims, 17 Drawing Sheets

Related Application U.S. Data 071, filed on Aug. 7, 2003, now Pat. No. 6,881,331, which is a continuation of application No. 09/794,601, filed on Feb. 27, 2001, now abandoned, and a continuation-in-part of application No. 09/752,982, filed on Dec. 31, 2000, now Pat. No. 6,623,635, which is a continuation-in-part of application No. 09/418,915, filed on Oct. 15, 1999, now Pat. No. 6,342,154, which is a continuation-in-part of application No. 09/393,437, filed on Sep. 10, 1999, now Pat. No. 6,192,911, and application No. 10/701,310, which is a continuation-in-part of application No. 10/668,504, filed on Sep. 23, 2003, now Pat. No. 7,135,108, which is a continuation-in-part of application No. 09/752,982, filed on Dec. 31, 2000, now Pat. No. 6,623,635, which is a continuation-in-part of application No. 09/418,915, filed on Oct. 15, 1999, now Pat. No. 6,342,154, application No. 11/137,890, which is a continuation-in-part of application No. 10/827,708, filed on Apr. 20, 2004, now Pat. No. 7,060,180, which is a continuation-in-part of application No. 10/061,752, filed on Feb. 1, 2002, now Pat. No. 6,723,233, which is a continuation-in-part of application No. 09/752,982, filed on Dec. 31, 2000, now Pat. No. 6,623,635, which is a continuation-in-part of application No. 09/418,915, filed on Oct. 15, 1999, now Pat. No. 6,342,154, said application No. 10/827,708 is a continuation-in-part of application No. 09/794,601, filed on Feb. 27, 2001, now abandoned, which is a continuation-in-part of application No. 09/752,982, filed on Dec. 31, 2000, now Pat. No. 6,623,635, said application No. 10/827,708 and a continuation-in-part of application No. 09/717,904, filed on Nov. 20, 2000, now Pat. No. 6,426,053, is a continuation-in-part of application No. 09/520,504, filed on Mar. 8, 2000, now Pat. No. 6,405,387.

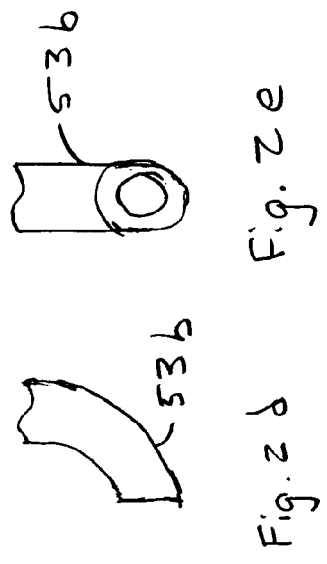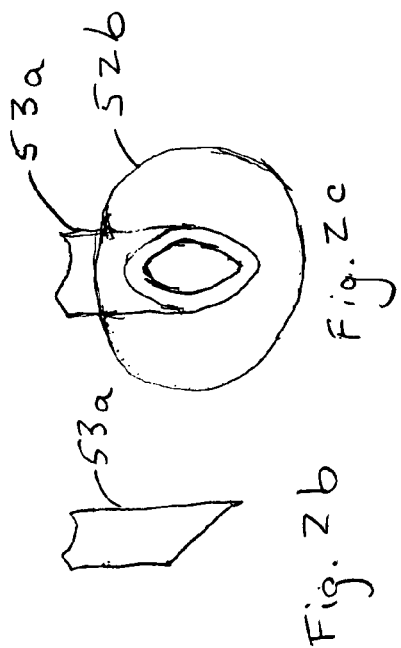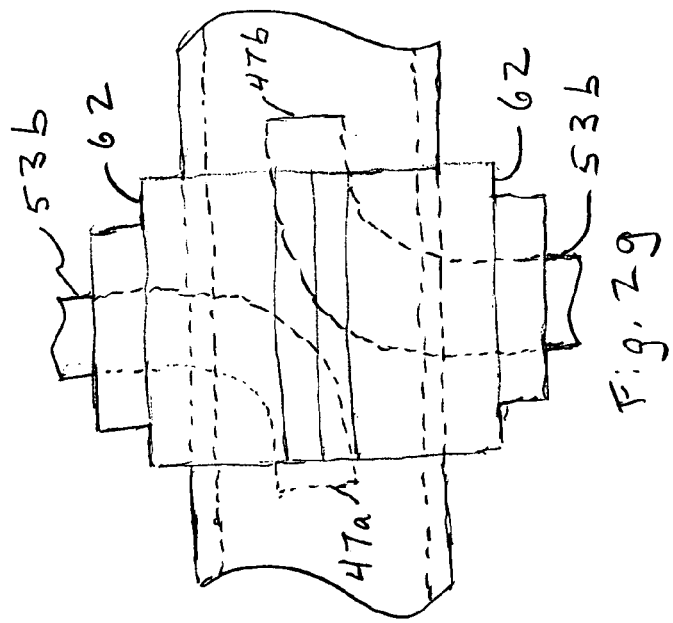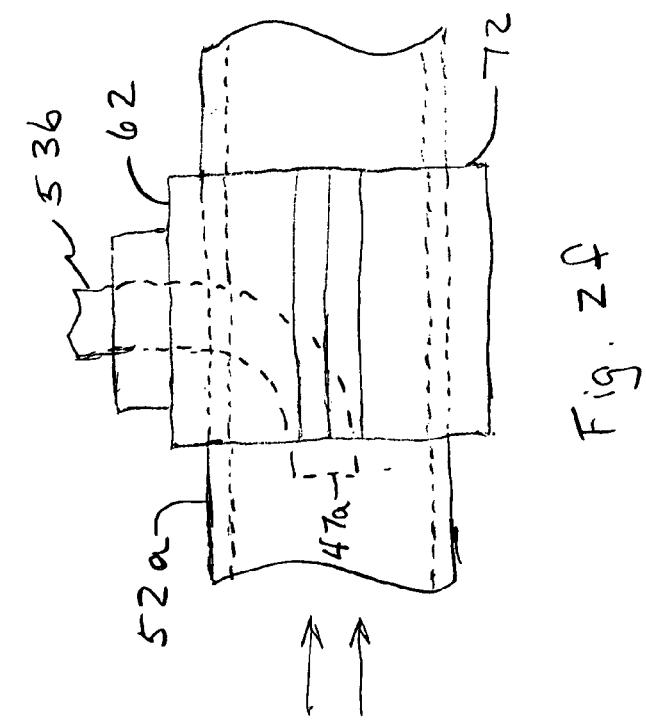

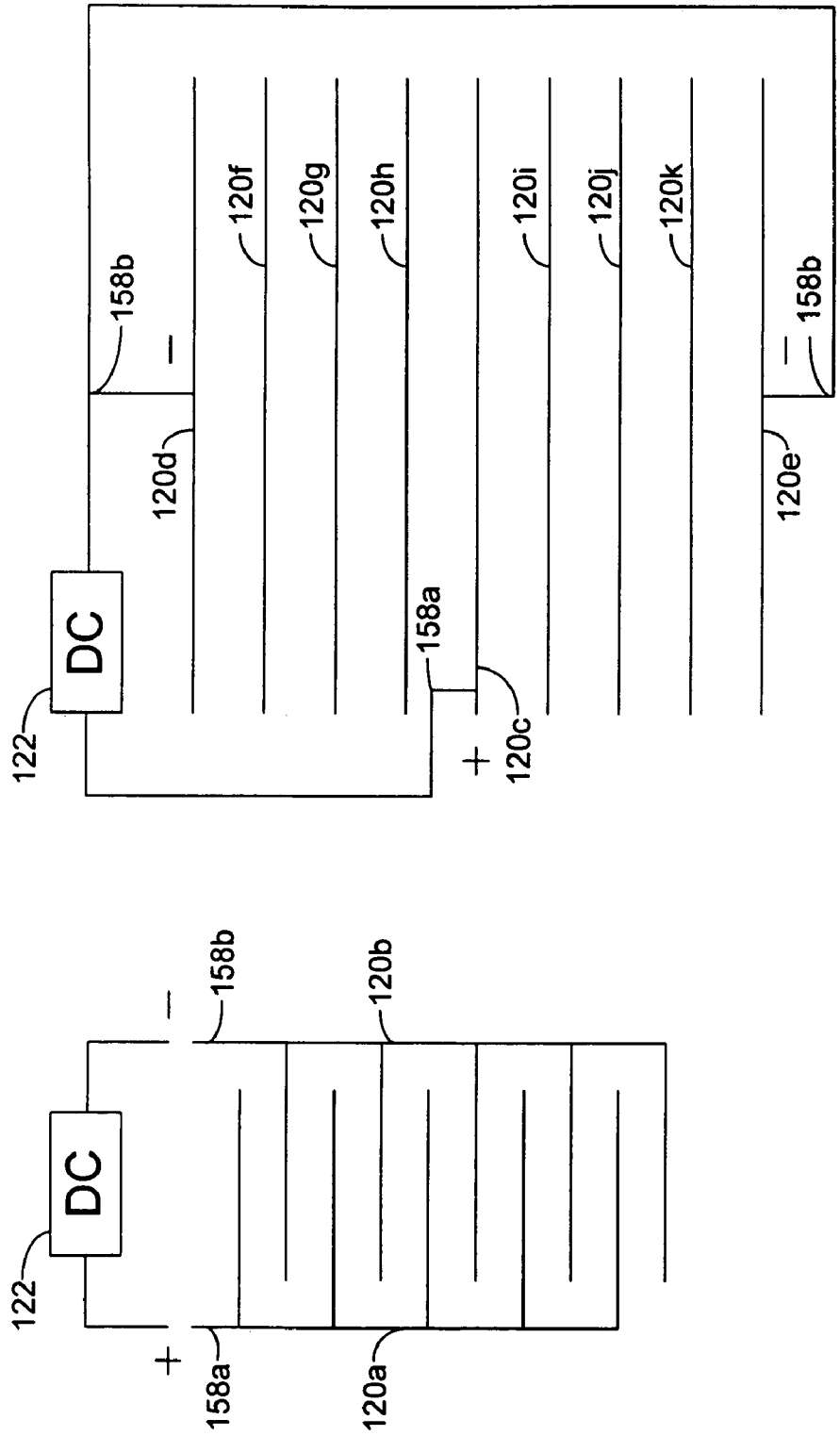

WATER TREATMENT BYPASS LOOPS HAVING OZONE AND CHLORINE GENERATORS

CROSS REFERENCE TO RELATED APPLICATIONS

The instant application is a continuation-in-part of Applicant's patent application Ser. No. 10/701,310, filed Nov. 4, 2003, now U.S. Pat. No. 7,186,334, which is a continuation-in-part of Applicant's patent application Ser. No. 10/636, 071, filed Aug. 7, 2003, now U.S. Pat. No. 6,881,331, which is a continuation of Applicant's now abandoned patent application Ser. No. 09/794,601, filed Feb. 27, 2001, which is a continuation-in-part of Applicant's patent application Ser. No. 09/393,437, filed Sep. 10, 1999, now U.S. Pat. No. 6,192,911, issued Feb. 27, 2001 and Applicant's patent application Ser. No. 09/752,982, filed Dec. 31, 2000, now U.S. Pat. No. 6,623,635, issued Sep. 23, 2003, which is a continuation-in-part of Applicant's patent application Ser. No. 09/418,915, filed Oct. 15, 1999, now U.S. Pat. No. 6,342,154, issued Jan. 29, 2002 and application Ser. No. 10/701,310 is also a continuation-in-part of Applicant's patent application Ser. No. 10/668,504, filed Sep. 23, 2003, now U.S. Pat. No. 7,135,108, which is a continuation-in-part of Applicant's patent application Ser. No. 09/752,982, filed Dec. 31, 2000, now U.S. Pat. No. 6,623,635, issued Sep. 23, 2003, which is a continuation-in-part of Applicant's patent application Ser. No. 09/418,915, filed Oct. 15, 1999, now U.S. Pat. No. 6,342,154, issued Jan. 29, 2002.

The instant application is also a continuation-in-part of Applicant's U.S. patent application Ser. No. 10/827,708, filed Apr. 20, 2004, now U.S. Pat. No. 7,060,180, which is a continuation-in-part of Applicant's patent application Ser. No. 10/061,752, filed Feb. 1, 2002, now U.S. Pat. No. 6,723,233, which is a continuation-in-part of patent application Ser. No. 09/752,982, filed Dec. 31, 2000, now U.S. Pat. No. 6,623,635, issued Sep. 23, 2003, which is a continuation-in-part of patent application Ser. No. 09/418,915, filed Oct. 15, 1999, now U.S. Pat. No. 6,342,154, issued Jan. 29, 2002. Also, application Ser. No. 10/827,708 is a continuation-in-part of Applicant's application Ser. No. 09/794, 601, filed Feb. 27, 2001, now abandoned, which is a continuation-in-part of patent application Ser. No. 09/752, 982, filed Dec. 31, 2000, now U.S. Pat. No. 6,623,635, issued Sep. 23, 2003. In addition, application Ser. No. 10/827,708 is a continuation-in-part of patent application Ser. No. 09/520,504, filed Mar. 8, 2000, now U.S. Pat. No. 6,405,387, issued Jun. 18, 2002, and a continuation-in-part of Applicant's patent application Ser. No. 09/717,904, filed Nov. 20, 2000, now U.S. Pat. No. 6,426,053, issued Jul. 30, 2002.

This application also claims the benefit of Applicant's copending provisional U.S. patent application No. 60/640, 957, filed Dec. 31, 2004, and Applicant's copending provisional U.S. patent application No. 60/650,293, filed Feb. 4, 2005, and Applicant's copending provisional U.S. patent application No. 60/633,107, filed Dec. 3, 2004.

FIELD OF THE INVENTION

This application relates generally to devices, apparatus, and methods for use in efficient installation of bypass loops for injection of chemicals into fluids, and particularly to bypass plumbing arrangements for enhanced exposure of water and contaminants to treatment substances.

BACKGROUND OF THE INVENTION

Increasing use of ozone in treatment of water in swimming pools, spas, whirlpool bath facilities, and other applications has lead to a need for greater flexibility and more efficient methods and devices for use and installation of equipment used to inject ozone and other chemicals, such as chlorine, into water or other fluids being treated. This is particularly true for those situations and applications wherein an ozone or chlorine related treatment capability is being added as a retrofit to existing plumbing associated with aforementioned pools, spas, bathing facilities, or other applications.

It has become a relatively common practice to generate chlorine, for use in swimming pools, spas, and other water treatment applications by electrolysis of a solution containing a chlorine salt. In conventional practice, common salt (NaCl) is dissolved in pool or spa water. An electrolysis cell, sometimes called a salt chlorine generator, or simply "salt generator," is installed in series with a pump and filter in a main line water circulation loop and used to electrolyze pool water to generate free chlorine from the brine solution. The chlorine then reacts with and oxidizes biological and other contaminants in pool water. However, introduction of salt into pool or spa water can lead to more rapid corrosion of hardware and equipment installed in a vicinity of a pool or spa. In addition, byproducts of electrolysis reactions in salt water include formation of sodium hydroxide and other undesirable chemicals. Since, in conventional practice, virtually all byproducts of an electrolysis reaction remain in circulating pool or spa water, it is necessary to neutralize or remove such byproducts to avoid exposing swimmers or bathers to increasing levels of caustic sodium hydroxide or other undesirable chemicals.

It is thus one object of the instant invention to provide apparatus and methods for efficient and adaptable installation into new or existing facilities of a capability for injection of ozone, chlorine, or other chemicals. It is another object of the instant invention to provide novel and unobvious apparatus and methods for generating chlorine and for combining use of chlorine and ozone using novel and unobvious techniques that use separate and combined properties of ozone and chlorine, and associated reaction byproducts, to obtain synergistic benefits relative to treatment and purification of water or other fluids.

Other objects of the invention will become clear upon a reading of the following specification.

BRIEF DESCRIPTION OF THE DRAWINGS

FIGS. 2b and 2c are side and front views showing how a tube can be cut at a slant to enhance flow in a bypass loop.

FIGS. 2d and 2e are side and front views showing how a tube with a curved section can be used to enhance flow in a bypass loop.

FIG. 2f is a side view of an adaptable clamp of the instant invention installed on a pipe and also illustrates optional use of a tube with a curved section.

FIG. 2g is a side view of an adaptable clamp of the instant invention showing how adaptable clamp components may be used to install both intake and return flows of a bypass loop at a single clamp location.

FIG. 3a is a schematic illustrating one alternative for energizing electrode plates in a salt chlorine generator.

FIG. 3b is a schematic illustrating another alternative for energizing electrode plates in a salt chlorine generator.

FIG. 11b provides a side-on sectional view of the embodiment shown in FIG. 11a.

DETAILED DESCRIPTION OF THE DRAWINGS

Figure 1:
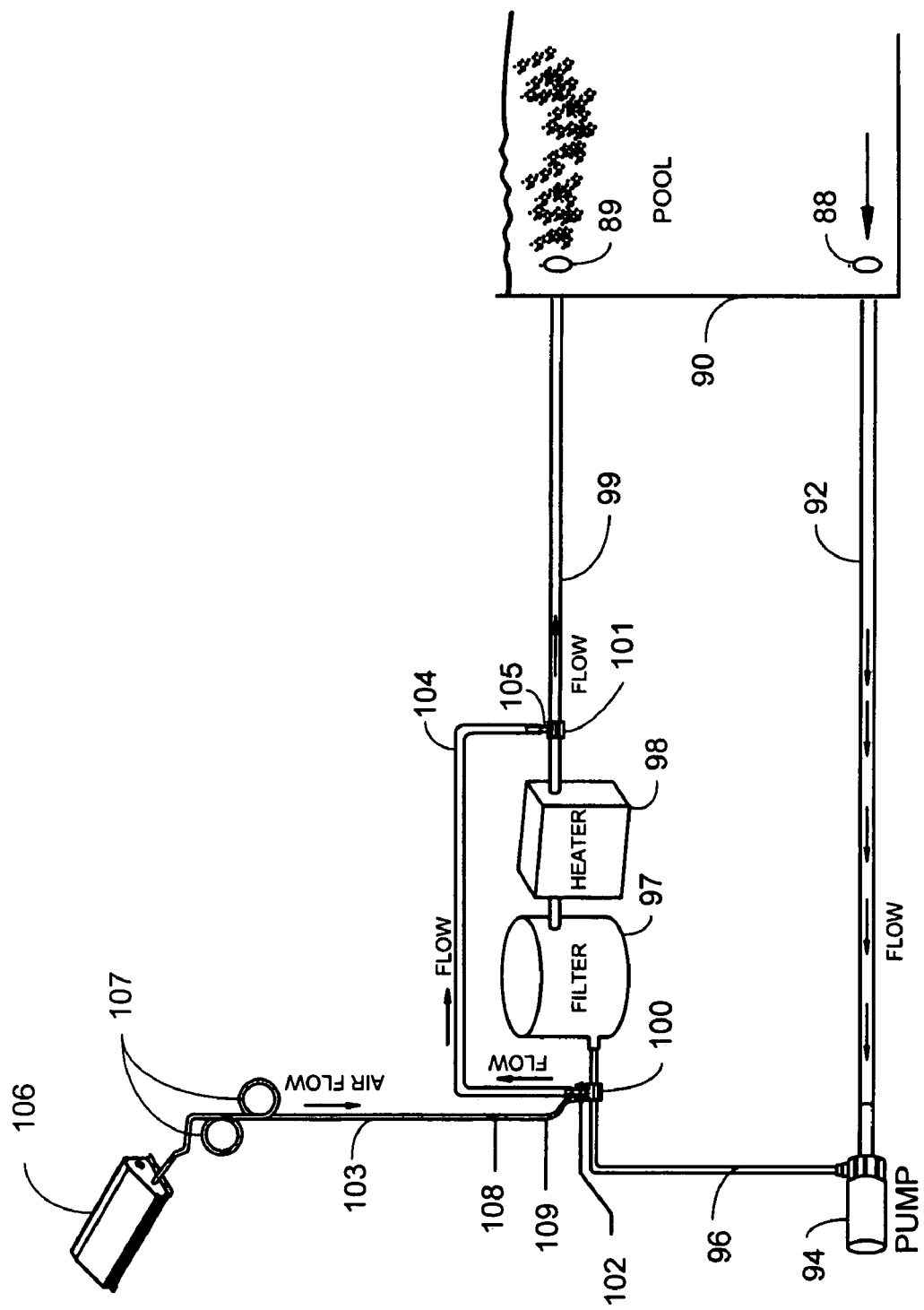
FIG. 1 is a partly schematic illustration of an ozone injection bypass loop that employs adaptable clamps of the instant invention.

FIG. 1 illustrates a representative installation and use of a bypass loop for injection of ozone to treat water in a swimming pool. In this illustrative example, representing a typical existing installation for a swimming pool pump and filter circulation loop to which a retrofit installation of additional water treatment equipment may be desired, water from a pool 90 is drawn through an opening 88 and a pipe 92 by a pump 94, which provides a motive force for water to flow through pipe 96 and through filter 97 and, in some installations, a heater 98, from which water is returned to pool 90 through pipe 99 and opening 89. A pressure drop across filter 97 from pipe 96 to pipe 99 provides a pressure differential motive force which may be employed to cause water to flow through a bypass loop 104. Pipes 96 and 99 are typically made of one and one-half inch (1.5 inch) or two inch (2.0 inch) rigid plastic tubing, but may also be of other diameters or materials. In a typical retrofit installation employing apparatus and techniques of the instant invention, Applicant's adaptable clamps 100 and 101, hereinafter referred to as adaptable clamps, may be employed to install a bypass loop 104 around filter 97 and heater 98. A device 102, which may be a Venturi device as disclosed in Applicant's prior patents, may be installed to permit introduction of one or more chemicals into fluid flowing through bypass loop 104. A typical chemical used in such installations may be ozone generated in an ozone generator 106 and provided to an intake port on a Venturi device 102 through tubing 103. Venturi 102 may contain a check valve, or a check valve 108 or loops 107 may be provided to prevent unintended backflow into an ozone generator 106 or other apparatus being used to provide a chemical for injection through device 102. Ozone generator 106 may be a generator that uses an ultraviolet lamp to create ozone in air drawn from an ambient atmosphere, which in some embodiments may include compressed air from an air compressor, or in oxygen drawn from a source of concentrated oxygen, which may include oxygen stored in tanks or an oxygen concentration unit, such as a pressure swing adsorption oxygen concentrator. In another embodiment, ozone generator 106 may be a generator that uses a corona discharge to create ozone from either oxygen or a mixture including oxygen and little or no nitrogen, e.g., as from a pressure swing oxygen concentrator. A feed gas mixture with little or no nitrogen helps avoid production, in a corona discharge device, of nitrogen oxides or other undesirable nitrogen compounds into fluids being treated.

Use of a bypass loop such as loop 104 for injection of treatment chemicals offers several advantages over direct injection of chemicals into main flow line lines such as pipes 92, 96, or 99. One advantage is ease of installation, particularly as a retrofit to an existing installation using Applicant's adaptable clamp. Another advantage is an ability to obtain higher concentrations of treatment chemicals in fluid flowing through a bypass loop. Yet another advantage, as will be illustrated in subsequent drawings and discussions herein, is a capability to control flow rates and to use additional apparatus to obtain better control of mixing of treatment chemicals and exposure thereof to contaminants, and to support separation, recovery, and recycling of selected treatment chemicals. Competition of requirements may make use of such techniques more difficult to implement directly in a main flow line rather than in a bypass. An ability to obtain higher concentration of treatment chemicals often leads to enhanced efficacy and lethality against many pathogens or other undesirable organic species and provides less opportunity for populations of undesirable organisms to develop resistance through survival of the most resistant organisms. Higher concentrations of chemicals within a bypass loop may more effectively expose such organisms to higher levels of chemicals, thereby killing those organisms that may otherwise survive.

Figure 2:
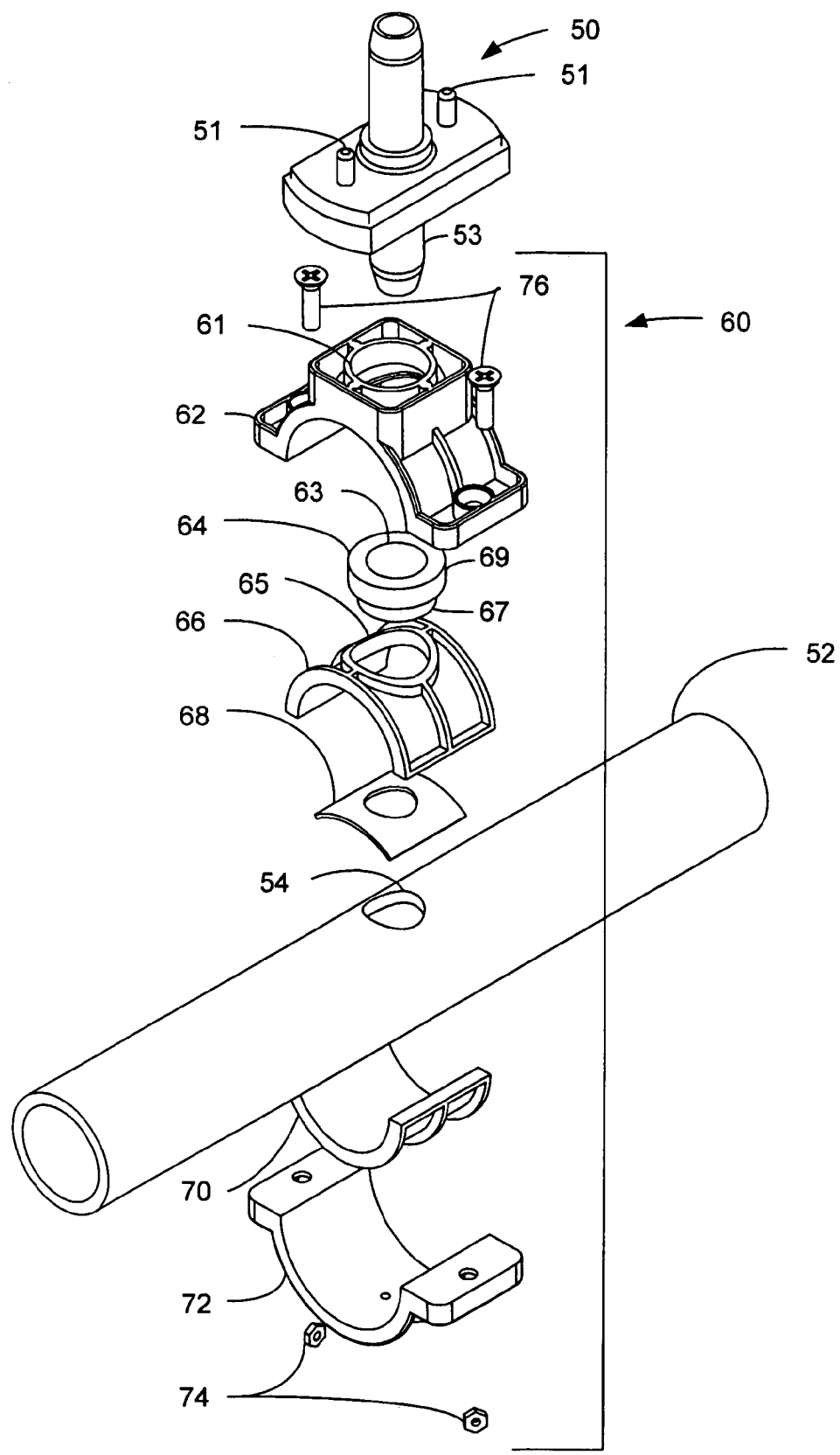
FIG. 2 is an isometric exploded view of an embodiment of an adaptable clamp of the instant invention for use with a smaller diameter pipe.

FIG. 2 provides an exploded view of my new adaptable clamp that includes novel and unobvious features to support adaptation and installation on pipes of different diameters, and to provide features and flexibility for efficient installation of devices such as a Venturi device or just a straight tube as needed on a particular installation. Having an adaptable clamp design that can adapt to pipes of different diameters reduces the number of different components an installation or repair technician must stock or take to a job site, and increases likelihood that components needed to complete a given installation are instantly available. In addition, an adaptable clamp of the instant invention provides for direct installation of a Venturi, such as disclosed in Applicant's prior patents, or for direct installation of another injection or mixing device.

Still referring to FIG. 2, an adaptable clamp 60 and installation thereof on a smaller pipe 52, e.g., 1.5 inch diameter, is shown. In this installation, compressive force may be provided by outer sections 62 and 72 in conjunction with fasteners, such as screws 76 and nuts 74. In another embodiment, outer sections 62 and 72 may be hinged on one side and a fastener such as a screw, rivet, pop rivet, or a push-through fastener with a gripping section that expands to hold items together may be used to apply or maintain a compressive force on a side opposite the hinge. In some cases, tools such as pliers or C-clamps may be used to compress sections 62 and 72 together around a pipe so that these outer sections may be secured in a compressed state using clips, clamps, rivets, or other fasteners or holding devices. For some embodiments, clips or clamps having a V-shaped channel with retaining ridges may be driven or compressed with a C-clamp onto one or more extended edges of sections 62 and 72 to draw the sections together around a pipe and secure them in place. Since dimensions of outer sections 62 and 72 are sized so as to permit direct installation of these sections on a pipe of larger diameter (e.g., 2.0 inch pipe), then additional sections 66 and 70 serve as shims for installation on a smaller diameter pipe. Multiple sections 66 and 70 of different thicknesses to accommodate smaller diameter pipes of different sizes may be used and may be packaged with one or more adaptable clamps to enhance likelihood that shims of required thickness will be available for a particular installation. In one embodiment, shim sections 66 and 70 may each comprise a plurality of thinner shims with each thinner shim having a thickness, for example, of 1/16 inch, so that one or more thinner shims could be removed to accommodate installation of an adaptable clamp on a pipe of larger diameter than a smallest diameter pipe on which an adaptable clamp of the instant invention could otherwise be installed. A pad or gasket 68 which may be made of silicone rubber, butyl rubber, polyurethane, VITON™ or other similar material, may be used to provide additional sealing where necessary between section 66 and an opening 54 created in pipe 52 before installation of adaptable clamp 60. Opening 54 is preferably created by use of a hole saw (nominally of 7/8 inch diameter in the current example) to avoid a risk of splitting plastic pipe 52 through use of a standard twist or flat-bladed drill, although a standard drill may be used successfully with adequate care. As a feature of the invention, a grommet 64 may be fabricated as a single piece of compressible resilient material, such as a silicone rubber material, butyl rubber, polyurethane, VITON™ or other similar material. As shown, grommet 64 is provided with a lower region 67, which may be cylindrical or which may have a tapered conical shape, that fits through an opening 65 in section 66 and may press against gasket 68 or side of pipe 52. An upper region of grommet 64 is provided with a shoulder 69 that butts and seals against a cavity 59 (FIG. 2h) in an underside of clamp section 62. For installation locations where a Venturi 50 or other injection or mixing device is needed, an extended cylindrical section 53 (FIG. 2) (having nominally the outer diameter of ½ inch pipe in the current example) of Venturi 50 may be inserted directly into elongated opening 61 in section 62 and into opening 63 in grommet 64 before fasteners 76 are tightened. In other instances, if only an open passageway is needed, a short length (e.g., approximately 3 inches) of pipe or rigid tubing of appropriate diameter may be inserted through elongated opening 61 in section 62 and generally into or through opening 63 in grommet 64. As fasteners 76 are tightened sidewalls 57 (FIG. 2h) of opening 61, which may optionally be tapered as shown by dashed lines 57a to form a conical surface, and a lip 55 formed at an upper end of opening 61, bears against shoulder 69 of grommet 64 and applies compressive forces to an opposite end 67 of grommet 64, which may optionally also be tapered into a mating conical shape, forcing an inner diameter of grommet 64 against cylindrical portion 53 of Venturi 50 (or other rigid tubing) inserted through openings 61 and 63. Also, an end of grommet 64 is forced against optional gasket 68, which in turn forces gasket 68 tight against pipe 52, or an end of grommet 64 is forced directly against pipe 52, thereby providing compressive seals that prevent leakage. In certain applications where a position of an inlet end of a Venturi extension tube 53 is to be located in a desired position relative to a cross-section of a flow of fluid in a main pipe, for example pipe 96 or 99 in FIG. 1, the design of adaptable clamp 60 provides for positioning the inlet end of Venturi 50 or other rigid tubing outside of a main flow or at any position within a cross-section of a fluid flow within main line pipes. For many installations, a section of flexible tubing may be slipped over an exposed end of Venturi 50 or aforementioned short length of tubing and secured with a hose clamp or the like to establish a desired routing for fluids and to prevent leakage. Referring back to FIGS. 2 and 2a, sections 62, 66, 70 and 74 of adaptable clamp 60 may be typically fabricated of PVC or another rigid plastic, preferably a plastic that can be injection molded, but for some applications, may be made of aluminum or other metal. Where the clamp is fabricated of stronger materials, reinforcing ribs and other strengthening characteristics illustrated in FIG. 2 may not be required.

It should be noted that Applicant's particular feature of a grommet 64 to provide a seal between an inserted tube and a pipe offers several benefits over saddle clamps of the prior art that typically employ a threaded connection through a flow-connecting portion of a clamp. Use of Applicant's grommet 64 not only supports reversible use of the grommet with different sizes of main line pipe, but also permits use of Applicant's adaptable clamp with intersecting unthreaded tubing, which unobviously provides greater flexibility in adjusting the depth of installation of a bypass intake or return line within a main line pipe to thereby help control bypass flow, and also unobviously permits optional use of bent sections to promote intake or return flow as illustrated in FIGS. 2f and 2g.

Figure 2A:
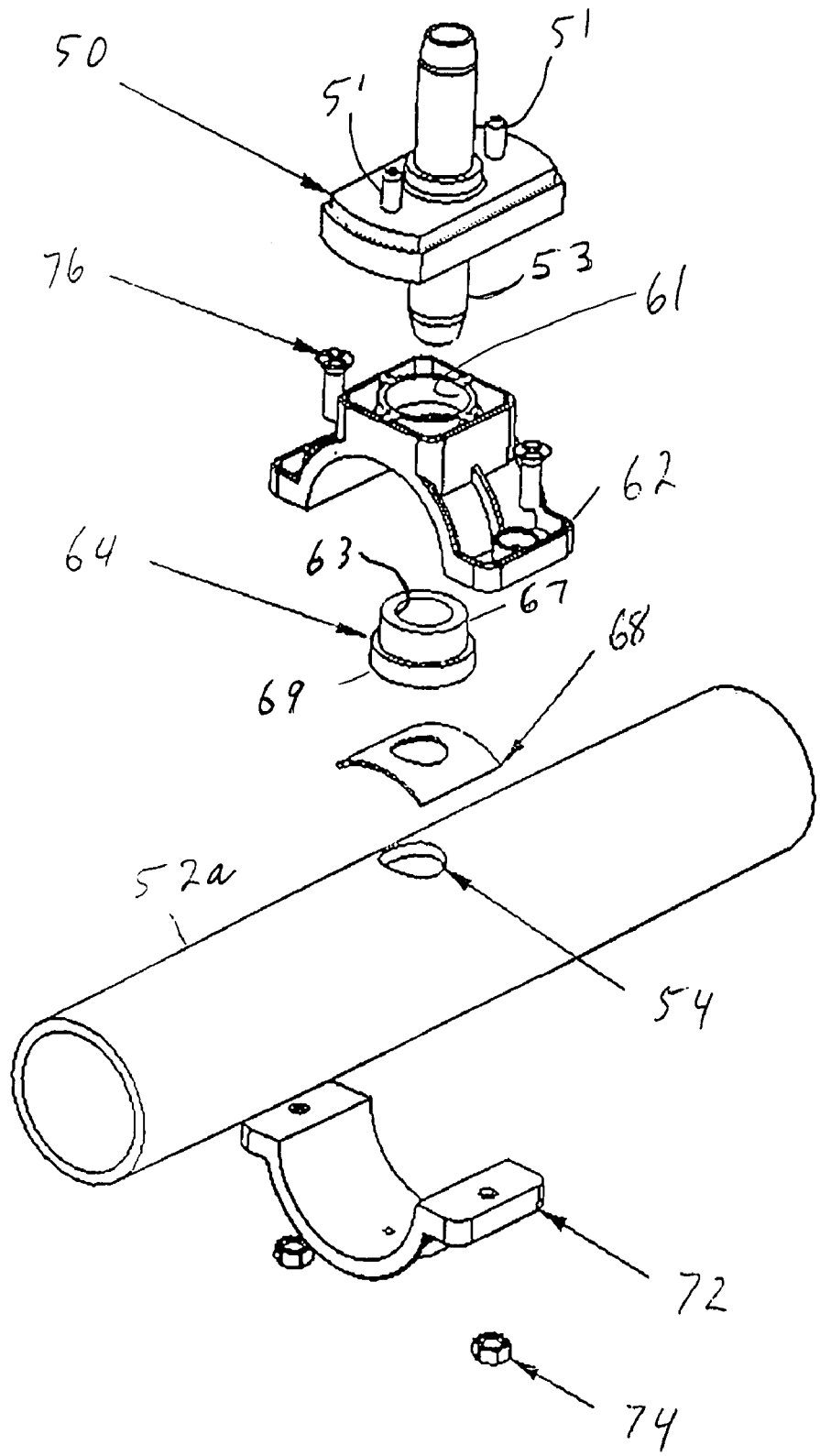
FIG. 2a is an isometric exploded view of an embodiment of an adaptable clamp of the instant invention for use with a larger diameter pipe.

When adaptable clamp 60 is used to provide a connection to a pipe 52a of a larger diameter within its adaptable range, as illustrated in FIG. 2a, inner sections 66 and 70 are omitted from the assembly and grommet 64 is reversed so that the extended portion 67, which, as noted, may be conical in shape, is inserted into an innermost end of opening 61 in section 62. As noted, sidewalls 57a (dashed lines) of opening 61 may optionally be tapered to provide a conical shape, as illustrated in FIG. 2h. In this configuration, the diameter of an opening created when sections 62 and 72 are assembled around a pipe 52a of larger diameter is sufficiently close to the diameter of the surrounded pipe 52a so that section 62 provides a compressive force against grommet 64, compressing an inner diameter of grommet 64 against an inserted pipe or section 53 of a Venturi 50, and compressing a shoulder of end 69 of grommet 64 against a gasket 68 or the pipe surface as described above A seal around an inserted pipe or extension tube 53 of Venturi 50 is provided by internal compression forces applied by lip 55 (FIG. 2h) and inner walls of opening 61, which may also be tapered as described above.

Inserted tube 53a in FIGS. 2b and 2c illustrate how an intake end of an extended cylindrical tube 53 of a Venturi 50, or an end of a simple rigid tube, could be cut at a slant and positioned in adaptable clamp 60 such that the open end faces into a direction of fluid flow in a main line pipe to enhance intake flow into a bypass loop, or facing away from the flow of fluid in a main line pipe to enhance an outlet or return flow from a bypass loop. The angle of the slanted cut may be varied to control the degree of flow enhancement through the bypass loop. In addition, position of an inserted tube 53a, and a diameter of inserted tube 53a, relative to an inner diameter 52b of a main line tube, may be varied in order to further enhance flow through a bypass loop.

Referring to FIG. 2f, inserted tube 53b in FIGS. 2d and 2e illustrate how an intake end of an extended cylindrical tube 53 of a Venturi 50, or an end of a simple rigid tube, may be formed into a curved section and positioned with its open end facing into a flow in a main line pipe, to enhance intake flow into a bypass loop. Conversely, the open end may be reversed to enhance return flow from a bypass loop. So that reversible grommet 64 may still be slipped onto a section of an inserted pipe 53b and provide a compressive seal, care must be taken in forming a curved section to avoid significant cylindrical deformation in the portion against which reversible grommet 64 seals, and to insure the radius of curvature will permit reversible grommet 64 to be slipped over an end of an inserted pipe 53b during fabrication or during installation of adaptable clamp components. In yet another configuration, illustrated in FIG. 2i, an end 58a of an inserted pipe 53c may be capped, crimped, or otherwise sealed, and an opening 49a may be formed in a side of the inserted pipe, with the opening facing into or away from a main line flow to achieve similar results as above.

Figure 2I:
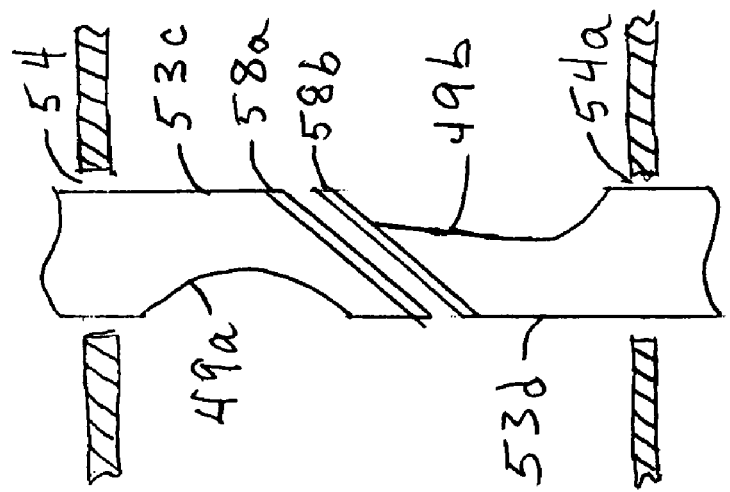
FIG. 2i is an illustration showing another embodiment whereby both intake and return flows of a bypass loop may be installed at a single clamp location.
Figure 2H:
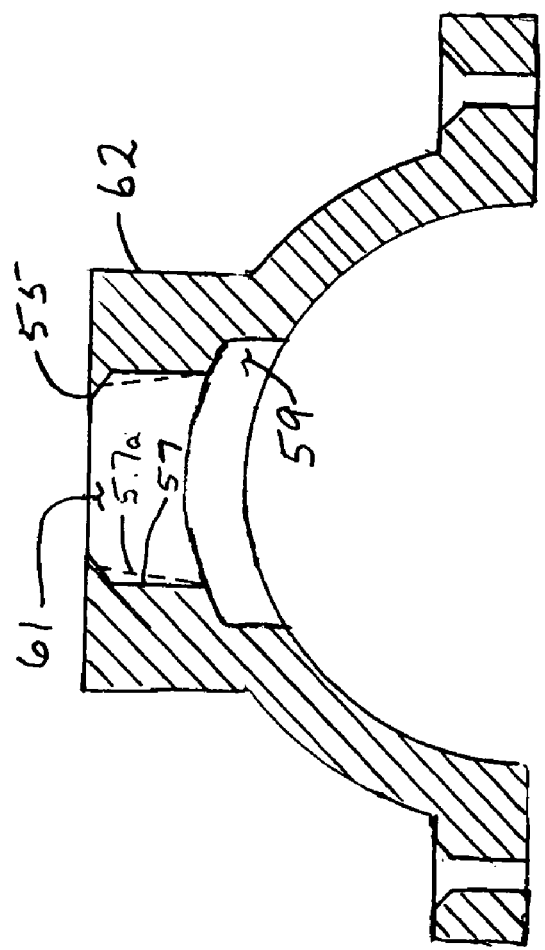
FIG. 2h is a cutaway sectional view of one portion of an adaptable clamp of the instant invention showing how opening may be shaped to enhance mold release and compression of a grommet.

FIGS. 2g and 2i illustrate another innovative application of components of an adaptable clamp of the instant invention. In an application where only moderate flow through a bypass loop is desired, or in an application where insufficient room or access to a pipe precludes installation of intake and return segments of a bypass loop in different locations along a main line pipe, then, as shown in FIG. 2g, two sections 62 of adaptable clamp components may be used and installed on opposite sides of a main line pipe, with an open end 47a of one inserted tube 53b facing into the flow to provide an intake for a bypass loop, and an open end 47b of a different inserted tube 53b facing away from the flow to provide a return flow for a bypass loop. In yet another embodiment, as illustrated in FIG. 2i, ends 58a, 58b of inserted tubes 53c, 53d could be cut at a slant and sealed, and elongated openings 49a, 49b may be formed in side walls of the inserted tubes 53c, 53d, with said openings 49a, 49b alternately facing into or away from fluid flow in a main line pipe, thereby promoting flow through a bypass loop. Opening 49b in FIG. 2i is shown with an optional different shape from the shape of opening 49a to further illustrate optional measures which may be employed with Applicant's adaptable clamp. To help control bypass flow, the amount of slant and size of openings may be varied from a 90 degree cut, with openings which may be elongated up to approximately one-half the diameter of the main line pipe, up to a cut slanted so that a sloped end of an inserted pipe approximately spans the inner diameter of the main line pipe, with an opening which may be elongated to approximately the diameter of the main line pipe. Tubes inserted from either side may be positioned with their slanted ends adjacent, but with their respective openings facing in opposite directions, so as to enhance intake and return flows as described above.

Since there is a risk that creating a second opening 54a in an opposite side of a main line pipe could cause a loss of structural strength in a main line pipe, adhesive gasket tape, or pipe adhesive, cement, or caulk may be used to bond components 62 of an adaptable clamp to outer walls of main line pipe in order to reinforce a main line pipe.

Figure 3:
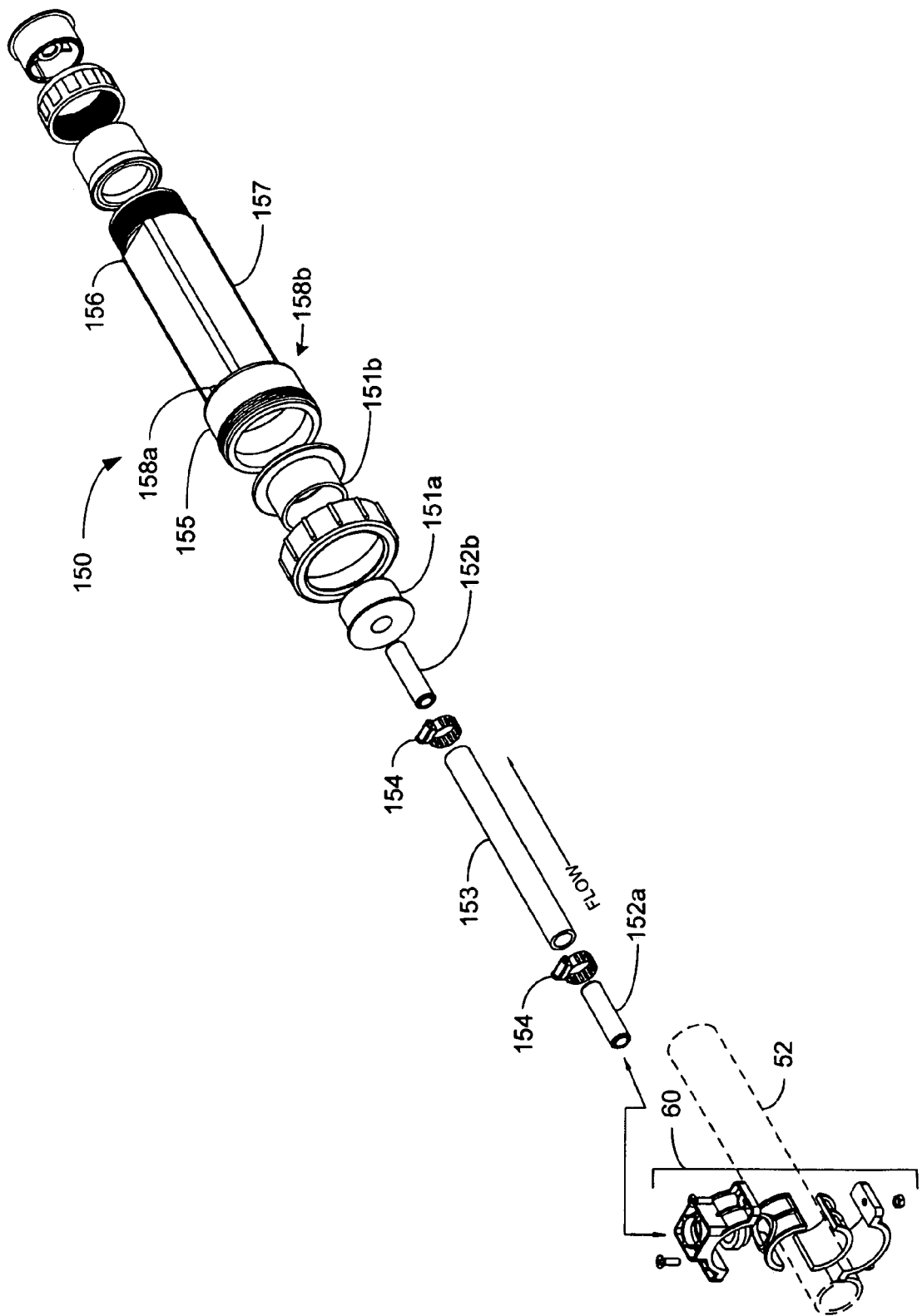
FIG. 3 is an illustration of a salt chlorine generator with components for installation using an adaptable clamp.

It was noted earlier herein that it has become a relatively common practice to use chlorine generators to generate chlorine from a salt solution by electrolysis. FIG. 3 illustrates how a conventional salt chlorine generator module 150, designed to be installed in series in a typical 1.5 inch to 2 inch diameter main line pump and filter circulation loop for a swimming pool or other bathing facility, may instead be installed in a bypass loop using Applicant's adaptable clamp 60 together with compressible reducing bushings 151a, 151b, short lengths of rigid tubing 152a, 152b, flexible tubing 153 of vinyl (or other ozone resistant material), and hose clamps 154 to provide a bypass flow from a main line pipe 52 to an inlet end 155 of salt chlorine generator module 150. Similar fittings (not illustrated) may be used to continue bypass flow from an outlet end 156 of chlorine generator 150 to other elements of a bypass loop or to another adaptable clamp 60 for return to a main flow pipe. In this type of salt chlorine generator 150, when conventionally installed in a main line of a typical pool filter circulation loop using conventional plumbing fittings, a brine solution resulting from addition of common salt (NaCl) to water in a swimming pool or spa flows through salt chlorine generator module 150. Module 150 may be a length of PVC pipe having a typical diameter of approximately 2 inches but which may also contain a section 157 having a generally rectangular cross section that includes a set of generally parallel electrodes which extend down a portion of the length of module 150 and which are separated by a distance which, in some embodiments, may be only a few millimeters, and arranged so that water containing salt may flow between the electrode plates. Electrode plates may be in a nested configuration, as illustrated in FIG. 3a, or in a stacked configuration as illustrated in FIG. 3b. Electrically conductive paths from internal electrode plates to an exterior of module 150 may be provided via terminals 158a (FIG. 3), 158b (not visible in FIG. 3) which may be located on the same or opposite sides (as illustrated), or in other convenient positions, and which may sealably penetrate walls of module 150, using epoxy or other conventional sealing methods to provide a watertight penetration.

With an electrode plate configuration such as illustrated in FIG. 3a, alternate electrode plates are supplied with a positive or negative voltage through terminals 158a (FIG.

3), 158b (not visible in FIG. 3) from a power supply, which may be any of the power supplies as described later herein, so that voltage between electrode plates is sufficient to cause electrolytic separation of chlorine from the brine solution flowing through generator 150. Some chlorine atoms may combine with other chlorine atoms to form diatomic chlorine gas, but in many cases, monatomic chlorine freed from solution at an electrode plate will rapidly react with organic compounds or organisms, or with other compounds contained within fluid being treated. These reactions of chlorine generally provide treatment through elimination or neutralization of contaminants within a fluid being treated.

Chlorine generating device 150 typically contains a set of electrical plates, or electrodes, with potentials applied thereto maintained by a DC power supply 122. Electrode plates may be made of titanium coated with ruthenium oxide and iridium, the combination of which has been found to promote release of chlorine from brine solution via electrolysis. In some embodiments, electrode plates 120a, 120b may be nested, as illustrated in FIG. 3a, with alternating plates maintained at either a positive or negative potential by wired connections to a DC power supply. In some embodiments, the polarity of the DC power supply may be changed manually or automatically at some interval in order to reduce buildup of deposits of calcium or other minerals on electrode plates. Depending upon concentration of calcium in water, an interval period for changing polarity may be 30 minutes. This schematic in FIG. 3a represents an end-on view of electrode plates that may be extend from less than an inch to several inches wide and which may extend from less than an inch to several inches in a direction of flow (into the page in FIG. 3a), depending upon the size of an electrolysis chamber and the desired quantity of chlorine or other chemical to be separated by electrolysis. More or fewer plates than shown may be used, but separation with fewer plates may approach dimensions of a structure used to contain an electrolysis cell. For electrode plates in a configuration such as shown in FIG. 3a, and depending upon plate dimensions, separation, and number of plates, only a moderately low voltage (e.g., 6 to 12 volts) is required to produce a relatively large electrolysis current (e.g., 10 to 20 amps) through a brine solution flowing between the plates, which in turn releases chlorine from the brine solution.

In another electrode plate configuration illustrated schematically in FIG. 3b, some conductive electrode plates, 120f-120h and 120i-120k, are not connected to wires but are allowed to have floating electrical potentials between other plates 120c, 120d, 120e connected to a DC power supply. Here, the potential difference between the plates connected to a DC power supply (e.g., plate 120c and plates 120d and 120e) is typically in a range of 20 to 35 volts, but resulting current flow (e.g., 4 to 6 amps) is generally much less than for a nested plate configuration in FIG. 3a. This voltage potential is believed to cause sufficient charge migration on the floating potential plates 120f-120h and 120i-120k such that one side of each plate appears positive with respect to a brine solution flowing through the plates, and the other side appears negative, so that electrolysis of the brine solution to release chlorine occurs between even the floating potential plates on the surfaces coated with ruthenium oxide and iridium. The greater potential gradients within a floating plate arrangement of FIG. 3b, driven by a higher voltage on the electrode plates wired to a DC power source, may also change electrolysis and related chemistry in the brine solution, resulting of release of some level of ozone in addition to chlorine.

Voltage potentials between alternating plates are conventionally maintained within a desired voltage range by a voltage controlling power supply, and, as noted, voltage polarity may be conventionally reversed periodically (e.g., every 30 minutes or so) in order to help reduce buildup of calcium or other deposits on electrode plates (which would eventually increase resistance to current flow and impede desired electrolytic action). However, for many applications, Applicant proposes that a current controlling power supply may provide enhanced or more predictable and better controlled performance by providing better control over rates of ion production and capture and thus rates of freeing of chlorine. A current controlled power supply may vary the applied voltage to maintain constant current and thereby compensate for buildup of corrosion or contaminants on plates or for other losses, and will also reduce likelihood of a damaging short circuit between plates.

Applicant also proposes that electrolysis cells such as described above are compatible with use of switching power supplies, which are capable of providing needed voltages and currents from standard 115 VAC or 220 VAC supply lines without requiring use of large bulky transformers. In addition, Applicant discloses that phase controllers and/or capacitors may be used in conjunction with a rectified AC power supply to change electro-chemistry in an electrolysis cell to produce more ozone in relation to chlorine. Later herein, Applicant also describes an unobvious method and benefit for injecting ozone for water treatment that may reduce or eliminate calcium buildup on electrode plates, which in turn may reduce costs by eliminating a need for periodically switching polarity of DC power, and permitting efficient operation with application of aforementioned ruthenium oxide and iridium coatings to only one side of electrode plates, rather than both sides as in conventional electrolysis cells wherein polarity reversal is needed to prevent buildup of deposits.

Following figures and discussions describe several types of bypass loops and chemical injection techniques that may be implemented for different purposes and effects related to treatment of water or other fluids within swimming pools, spas, hot tubs, whirlpool baths or other bathing facilities to which the instant invention applies. In addition, certain commercial facilities, such as water cooling towers, may also benefit from these treatment techniques. Although many of the bypass loops described herein may be implemented with more conventional plumbing fixtures and apparatus, they still fall within the scope of the instant invention. Applicant's adaptable clamp 60, especially when combined with Applicant's multiple port, annular injection Venturi 50 as disclosed in Applicant's other patents, permits quick and efficient installation of any of the system configurations disclosed herein, and provides enhanced flexibility and adaptability to support installation and use of many other possible combinations of bypass loops and chemical injection techniques that may be desired in new or retrofit applications.

Figure 4:
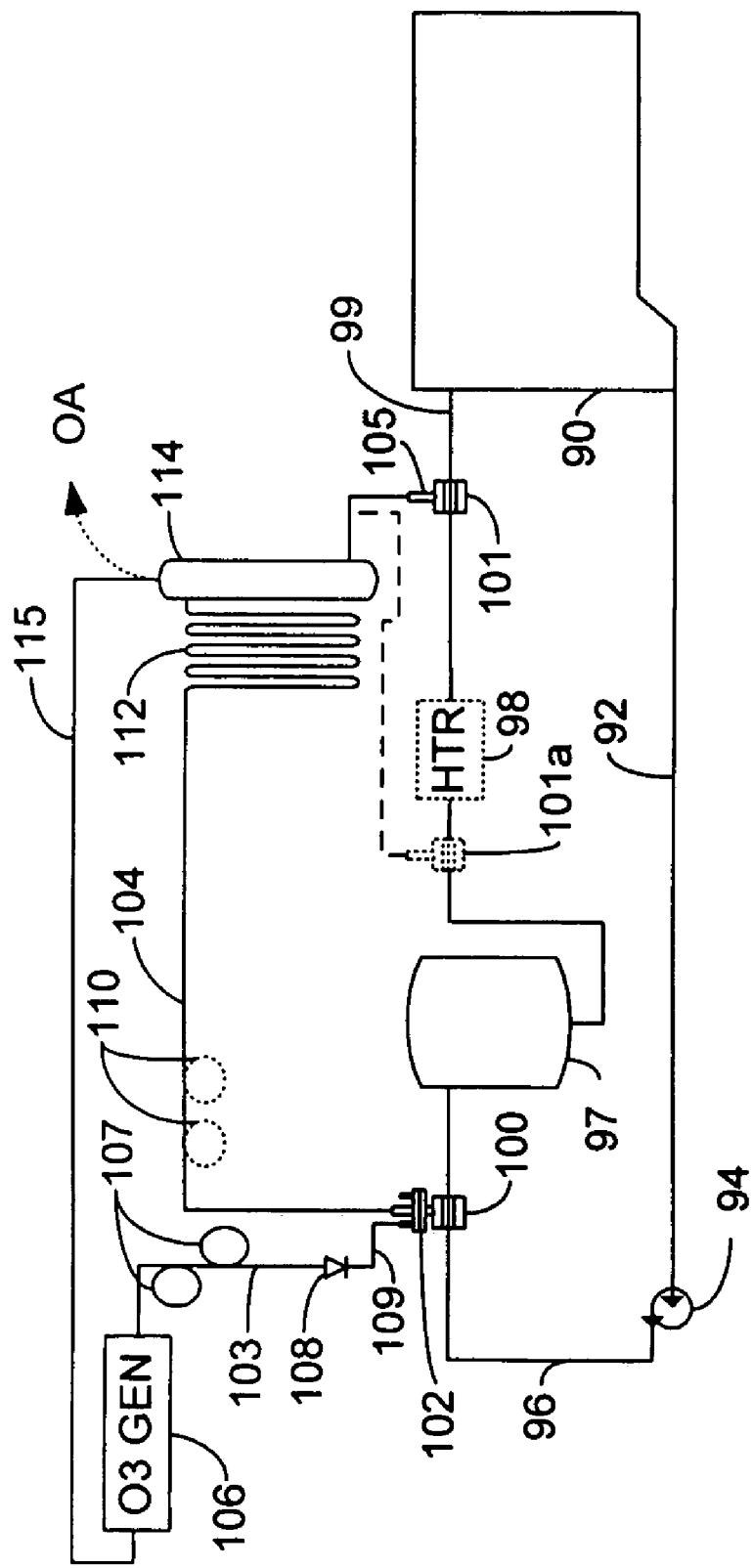
FIG. 4 is a schematic illustration of an embodiment of a water treatment installation showing use of adaptable clamps in a forward bypass loop using ozone with a Venturi injector, enhanced contactor section, separator tank, and captured gas return loop.
Figure 5:
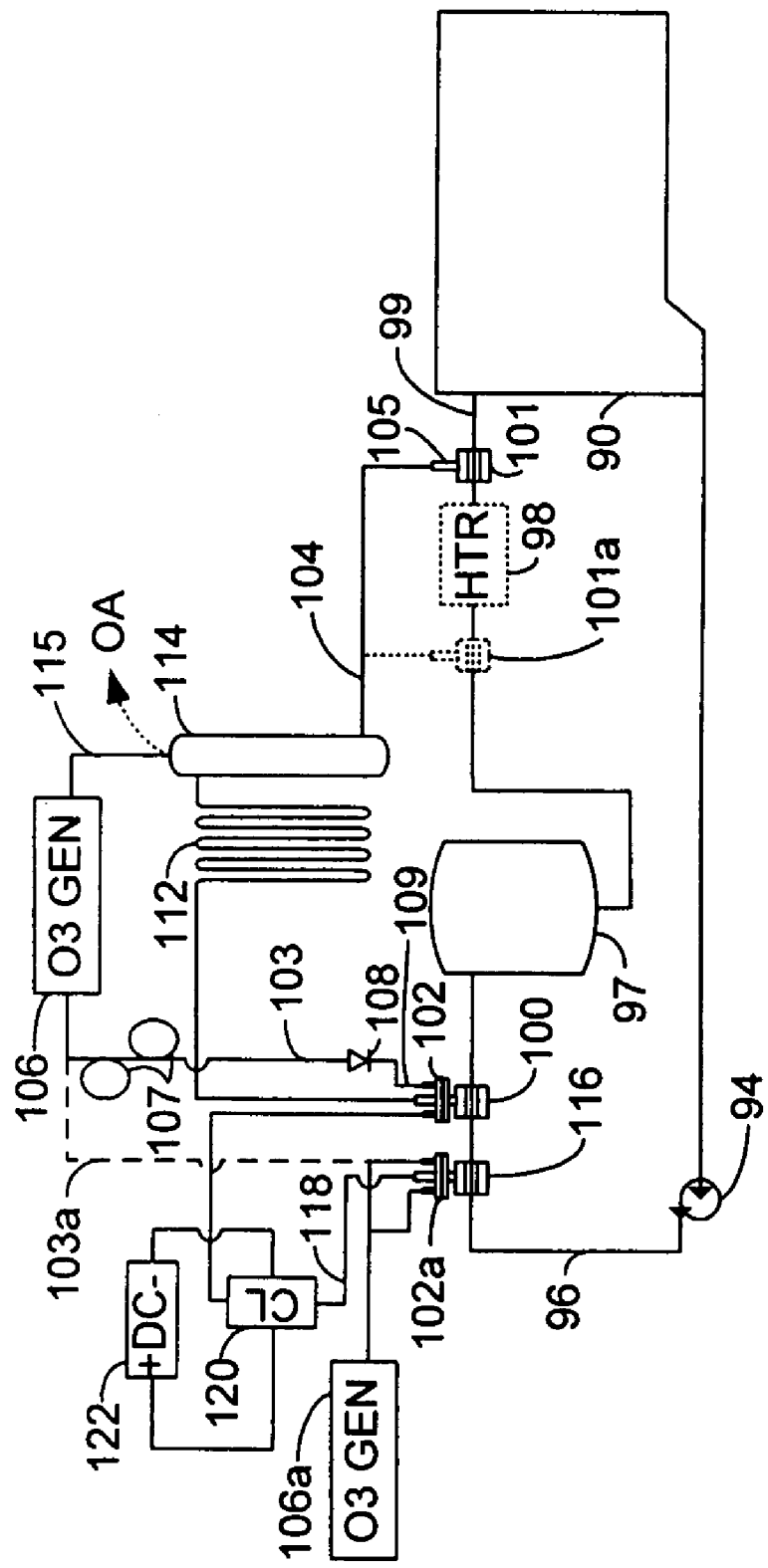
FIG. 5 is a schematic illustration of an embodiment of a water treatment installation showing use of adaptable clamps in a forward bypass loop as above but also including a chlorine generation loop.

FIG. 4 and several following figures use a somewhat schematic representation of various bypass installations contemplated for use in treating water for swimming pools or spas as well as treating fluids in other residential or industrial applications. In order to provide a transition from the more pictorial representation of a typical pool installation, as illustrated in FIG. 1, portions of FIG. 4 present essentially the same configuration as shown in FIG. 1, but in a partially schematic representation. In FIG. 4, as in FIG. 1, water is drawn from a pool 90 through a pipe 92 by pump 94, and then flows through pipe 96 to filter 97 and optional heater 98, returning to pool 90 through pipe 99. A bypass loop 104 is implemented between pipes 96 and 99 by use of adaptable clamps 100 and 101. In this illustration, adaptable clamp 100 is used together with a Venturi device 102 that has two ports, such as a Venturi injector available from Prozone, Inc., Huntsville, Ala., to provide an inlet to loop 104 from pipe 96. A tube 103 carrying a gas mixture containing ozone from ozone generator 106 is connected to at least one port of Venturi device 102, with any unused ports on Venturi 102 being capped or coupled to sources of other treatment chemicals. Anti-backflow loops 107 and anti-backflow check valve 108 may be used where necessary, although this Venturi also incorporates check valves. In another embodiment, one or more "Y" or "T" fittings may be used to connect tube 103 to multiple ports on Venturi 102 to increase a quantity of gas or fluid drawn into the Venturi. The system configuration illustrated in FIG. 4 also includes an enhanced contactor section 112 in bypass loop 104 to provide additional mixing or contact time of more highly concentrated sanitizers and other compounds to promote reactions between chemicals injected via Venturi 102 or other device and contaminants or other compounds in fluid flowing through bypass 104. Here, such higher concentration is achieved by injecting the sanitizers into only a portion of the water flow for the main pipe, resulting in a much higher sanitizer level in a bypass loop. The enhanced contactor section 112 may be a serpentine device as illustrated and as disclosed in Applicant's prior patents, which alternatively provides counter-flow mixing and laminar-flow mixing for gaseous bubbles of ozone or other chemicals injected into bypass flow via Venturi 102. In other embodiments, enhanced contactor section 112 may employ vortices or other mechanisms to promote mixing and contact between injected chemicals and contaminants or other chemicals in the bypass flow. For embodiments where enhanced mixing and contact provided by contactor 112 is not needed, contactor 112 may be omitted, but optional loops 110 could still be used in bypass 104 to provide some increased mixing and contact time for ozone or other chemicals to react with contaminants before being returned to a main flow stream via a rigid tube 105 inserted into adaptable clamp 101. FIG. 4 also illustrates use of a separator column or tank 114 in bypass loop 104 after enhanced contactor section 112. Separator tank 114 allows excess ozone, chlorine, oxygen, or other gases that have not been absorbed to escape a bypass flow before it is returned to a main flow and ultimately to a pool, spa or other facility. Separated gases may optionally be released to outside air (represented by "OA" in drawings in this application) or may be captured and returned through a return or feedback loop 115 to ozone generator 106. This is particularly beneficial when a source of concentrated oxygen, such as from an oxygen tank or a pressure swing oxygen concentrator, is used as a feed gas for an ozone generator since the gas escaping in separator tank 114 will likely be rich in oxygen. Use of a separator tank or column 114 also helps avoid undesirable buildup of gases around an enclosed pool or spa, which could lead to a fire hazard or health hazard. FIG. 4 also illustrates an optional configuration wherein bypass loop 104 is returned to main flow via an adaptable clamp located between filter 97 and heater 98. A potential advantage of this optional configuration is that added heat may enhance a desired reaction between chemicals and contaminants in the water, but a potential disadvantage is that some chemicals in a bypass flow may be highly corrosive to exposed copper or other metallic elements within a typical heater. A special heater configuration with ceramic coated heating elements, or other corrosion resistant features, may be required for reliable long term operation if loop 104 is returned to main flow before a heater 98. FIG. 5 illustrates a system configuration similar to that illustrated in FIG. 4 except that, for clarity, ozone generator 106 is repositioned and tubing 103 is shown connected to a different port on Venturi 102. A chlorine generation bypass loop 118 is also illustrated in FIG. 5. Loop 118 originates at adaptable clamp 116, which may contain a second Venturi 102a to which flexible tubing may be attached, as by use of a hose clamp or the like, the loop terminating at an opposite end at an intake port on Venturi 102. Motive force for moving fluid from pipe 96 through loop 118 is provided by a pressure difference between fluid contained in pipe 96 and pressure within an injection port of Venturi device 102. Loop 118 contains a chlorine generating device 120, which may be an electrolysis device similar to generator 150 illustrated in FIG. 3 and described therewith. In addition to the foregoing, and as another feature of the instant invention, it has been found that orienting a chlorine generating electrolysis cell, such as might be used at block 120, so that the flow of brine solution through the electrode plates is generally vertically upward, and injecting ozone in the brine solution a short distance before the solution reaches the electrolysis cell, nominally 2 to 4 feet so as to provide some contact distance for some injected ozone to dissolve into the brine solution, but while also retaining some bubbles in the flow, reduces buildup of calcium and other deposits on the electrode plates. It is thought that reaction of ozone with material starting to deposit on electrode plates causes micro-fractures or other effects that cause deposited material to detach and be carried away in the flow of brine solution, so that deposit buildup on electrode plates is prevented or reduced without necessarily requiring an added complexity of periodically switching polarity of DC power supplied to electrode plates. Similar benefits in controlling or removing buildup of deposits on electrode plates may be obtained by an injection of an acid, such as hydrochloric acid (HCl) to a brine flow a short distance upstream of an electrolysis cell, although the resulting chemistry is different. Accordingly, use of a second Venturi 102a in loop 118 permits injection of a gas mixture containing ozone from ozone generator 106a, thereby creating a mixture of dissolved ozone and gas bubbles containing ozone in the fluid flowing through salt chlorine generator in loop 118. A "T" or "Y" fitting, or a 3-way valve, may be used to divide the output gas mixture from ozone generator 106a between multiple injection ports on Venturi 102a. In other embodiments, ozone generator 106a may be omitted and an optional tube 103a may be added between ozone generator 106 and input ports on Venturi 102a, or another injection device. Such embodiments may be used when the output gas mixture from ozone generator 106 has sufficient volume to supply both Venturi 102 and 102a. However, additional valves or pressure regulators needed to adjust flow of gas mixture between Venturi devices 102 and 102a, or other injection devices, will generally make such an arrangement less desirable. For some types of injection devices, such as those employing a sintered metal diffusion plate or cylinder, sufficient positive pressure (e.g., as from a pressurized ultraviolet ozone generator) to overcome fluid pressures may be required to promote injection. Embodiments using injection of ozone so as to create a mixture of dissolved ozone and bubbles containing ozone may not require use of polarity switching DC power supplies, and may not require ruthenium oxide and iridium coatings on both sides of electrode plates in salt chlorine generators. Reduction of deposit buildup in such embodiments may also permit more efficient operation of salt chlorine generators, further saving costs by permitting use of smaller electrode plates. However, in other embodiments and applications where deposit buildup is not a problem, or is controlled by other techniques, ozone generator 106a may be omitted, and Venturi 102a may be replaced by a simple rigid tube to provide a fitting for attachment of tubing for bypass 118. Additional embodiments that benefit from electrode plate deposit control using ozone are illustrated later herein.

In addition, in the system configuration illustrated in FIG. 5, chlorine from chlorine generator 120 in bypass loop 118 is injected into chemical injection and mixing bypass loop 104 via an injection port in Venturi 102 simultaneously with a gas mixture containing ozone from ozone generator 106 introduced through a second injection port in Venturi 102. An enhanced contactor section 112, a separator tank 114, and a captured gas return loop 115 are also included in bypass loop 118 with benefits as explained earlier for system configurations as shown and described in FIG. 4. This configuration for simultaneous injection of both chlorine and ozone into fluid flowing through bypass 104 offers at least two advantages over more conventional injection techniques. First, ozone reacts with some of the organic compounds contained within fluid flowing through bypass 104, thereby allowing more chlorine to be preserved for its longer term benefits in reacting with biological and other contaminants in fluid being treated even after bypass flow 104 is returned to main flow and to pool or other reservoir 90. Secondly, based on tests and observations of Applicant, it is believed reactions between moderately reactive chlorine and highly reactive ozone may lead to a metastable excited state of chlorine or chlorine compounds, or an excimer compound (e.g., OCl) of oxygen and chlorine, or to other reactive byproducts. Some of these resulting metastable or excimer states of chlorine or chlorine byproducts may have enhanced reactivity over that of chlorine or ozone alone, thereby providing enhanced efficacy in destroying undesirable compounds and enhanced lethality against undesirable organisms, but other chlorine byproducts may have an oxidation potential between that of ozone and chlorine alone. Since some organisms or other contaminants may be controlled by these excited, but longer lived, states of chlorine or reactive byproducts resulting from reactions of chlorine and ozone, there is less waste of the high lethality of ozone against organisms that could be controlled by the excited states of chlorine. Enhanced efficacy and lethality may also permit adequate control of contaminants and organisms with less use of NaCl or other chlorine compounds, leading to secondary benefits of less corrosion or reduction in other disadvantages of using salt in pool or spa water. Similar reactions and effects may also be created by addition to pool or spa water, in limited amounts, of other halogen salts of sodium (e.g., NaBr) or halogen salts of other metals (e.g., KCl, KBr) instead of or in addition to conventional use of NaCl. As such, halogens such as bromine would be released by electrolysis and may then be injected, along with ozone, into a fluid being treated in order to obtain beneficial reactions as described between ozone and such other halogens.

It should be obvious that an intermediate configuration could also be implemented wherein an enhanced contactor is included but separator tank 114 and return loop 115 are omitted. Other intermediate configurations omitting an enhanced contactor but retaining a separator tank 114, or a separator tank 114 and captured gas return loop 115, could also be implemented with benefits as describe earlier herein.

Figure 6:
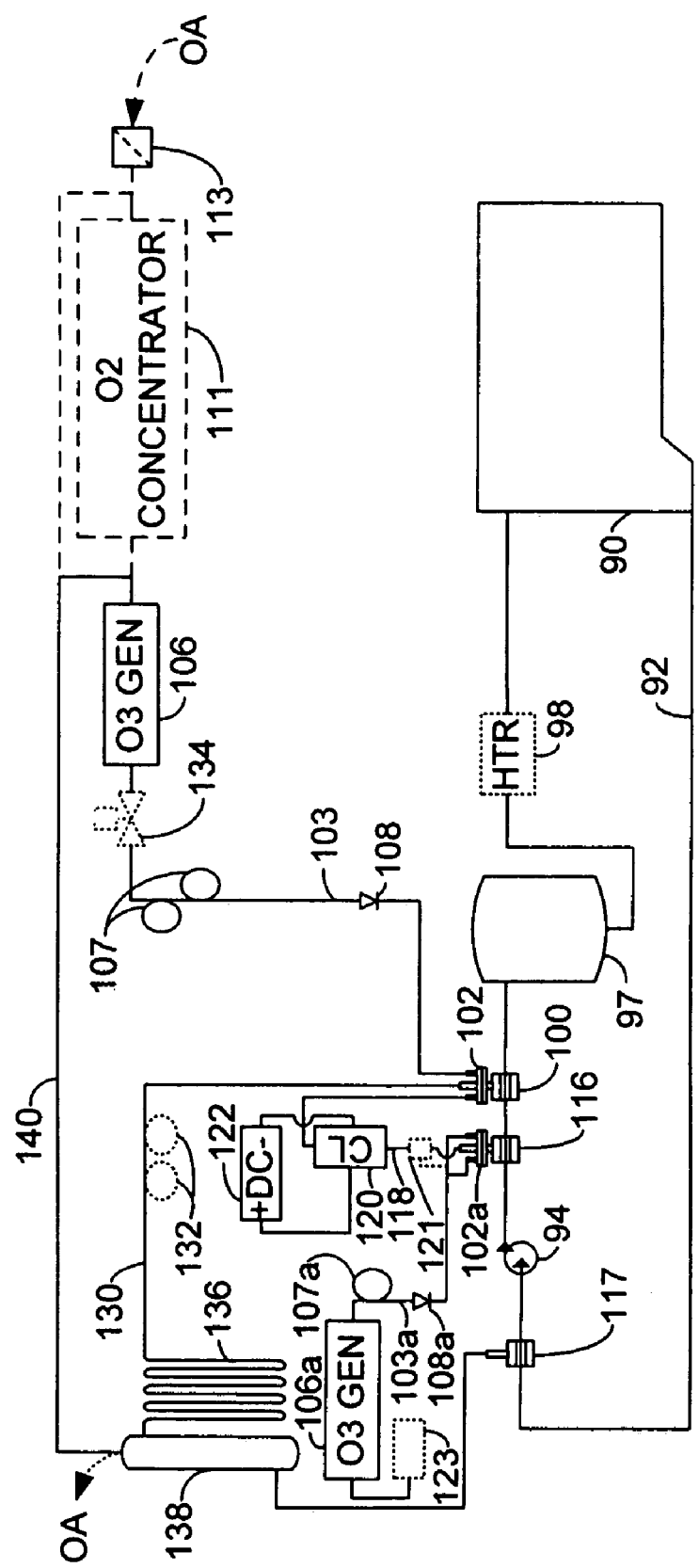
FIG. 6 is a schematic illustration of an embodiment of a water treatment installation showing use of adaptable clamps in a reverse bypass loop using ozone and chlorine generators with Venturi injectors, enhanced contactor, separator tank, and captured gas return loop.
Figure 7A:
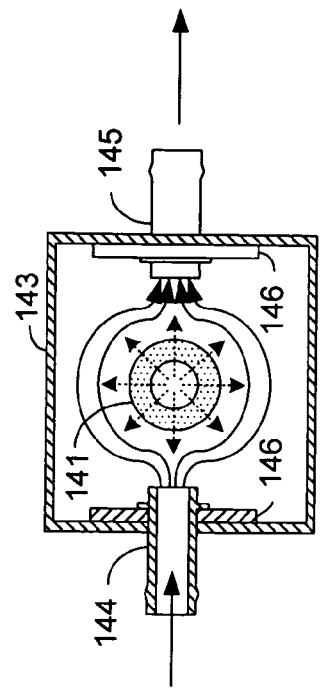
FIG. 7a is a cross-sectional illustration of a diffusion injector that may be used to diffuse ozone or other gases into liquids being treated.
Figure 7B:
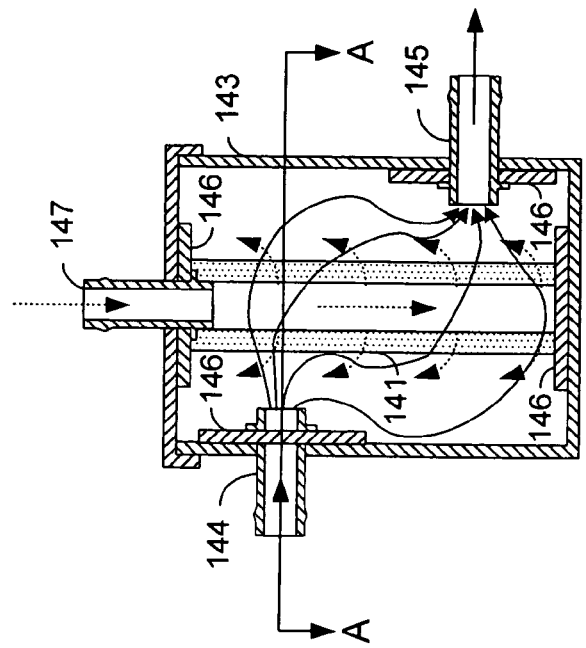
FIG. 7b is a top down partly sectional view of a different embodiment of a diffusion injector that may be used to diffuse ozone or other gases into liquids being treated.
Figure 7C:
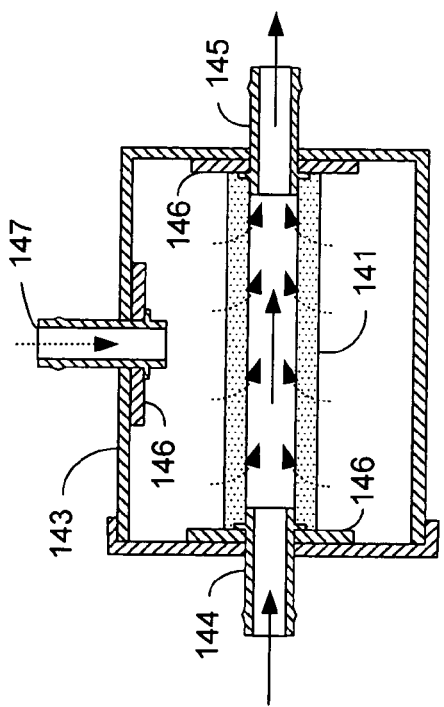
FIG. 7c is a side-on sectional view of a diffusion injector as illustrated in a top-down sectional view in FIG. 7b.
Figure 7D:
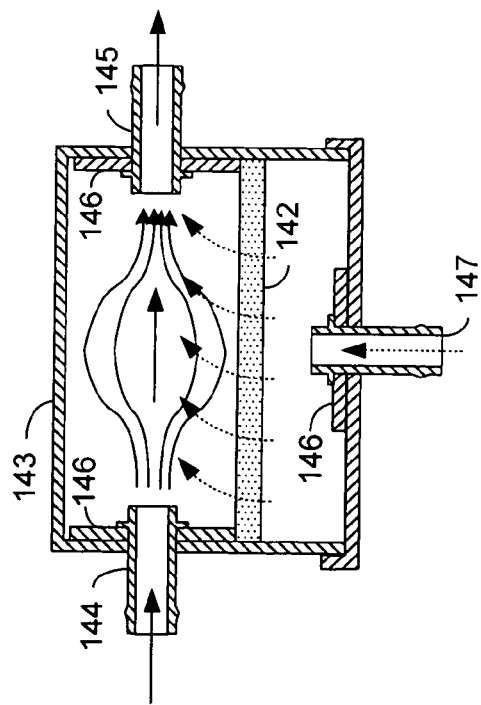
FIG. 7d is a side-on sectional view of a different embodiment of a diffusion injector that may be used to diffuse ozone or other gases into liquids being treated.

FIG. 6 illustrates a system configuration implementing a reverse injection and mixing loop 130 rather than a forward injection and mixing loop 104 as illustrated in previous figures. Reverse injection and mixing bypass loop 130 is implemented between a discharge port of Venturi 102 and a short length of rigid tubing held in adaptable clamp 117, which is installed on an intake side (pipe 92) of pump 94. Motive force for moving fluid through reverse bypass loop 130 is provided by a pressure difference between a higher pressure at an intake tube on Venturi 102 and a lower pressure in pipe 92 near an intake to pump 94. Reverse bypass loop 130 may also include a contact enhancement device 136 and separator tank 138. As explained earlier in association with FIGS. 4 and 5, contact enhancement device 136 may be a serpentine contactor, as illustrated and disclosed in Applicant's prior patents, but may also be a device using a vortex, impeller, or other techniques to increase mixing and contact of treatment chemicals injected via Venturi 102 with other treatment compounds and with contaminants in fluid flowing through loop 118. In the configuration illustrated in FIG. 6, gases separated in separator tank or column 138 may be released to outside air ("OA"), or, as illustrated in FIG. 6, may be captured and recycled through tube 140 to ozone generator 106 (and/or, optionally, generator 106a) to enhance efficiency or to reduce release of potentially hazardous gases that may result from some treatment techniques.

As shown in FIG. 6, a gas mixture containing ozone from ozone generator 106 is routed to an injection port in Venturi 102 through tubing 103, which may contain anti-backflow loops 107 and/or a check valve 108 to prevent backflow of fluid being treated into ozone generator 106. The gas mixture containing ozone is injected and mixed through Venturi 102 into fluid flowing through bypass loop 130.

Other treatment chemicals such as chlorine or bromine may be injected via Venturi 102 in alternate embodiments. Optional contact enhancing loops or coils 132 may be used to provide additional contact time or distance to enhance reactions between ozone or another chemicals and contaminants or other compounds in fluid flowing through reverse bypass loop 130.

One advantage of using a reverse bypass loop 130 is that precipitants resulting from reactions between injected treatment chemicals and contaminants or other compounds in a fluid being treated may be removed from a main flow by filter 97 before treated fluid is returned to a pool, spa, or other reservoir 90. Another advantage is that a pump may act as a mixing and contact enhancing device since turbulence created in a fluid by a typical pump will increase likelihood of exposure and reaction between injected treatment chemicals and contaminants or other compounds in fluid being treated. As noted earlier, unused injection ports on the Venturi are capped.

Intermediate configurations involving either an enhanced contactor section 136 or a separator tank 138 without the other are also possible and may be beneficial for some applications. Note that, in system embodiments using a reverse bypass loop 130, with a loop return connection 117 in the intake pipe for pump 94, but that do not also employ a separator tank or column 138 to release undissolved, entrained gases from fluid being treated, the quantity of entrained gases from loop 130 reaching pump 94 could be significant. In order to avoid potentially damaging or disruptive cavitations within pump 94 in such embodiments, a flow control valve 134 or a pressure regulator or similar metering device may be required in tubing line 103 or at the associated injection port of Venturi 102 to control flow of gas into Venturi 102 and thus the amount of gas entrained in fluid flowing through reverse bypass loop 130. Valve 134 is thus illustrated as an optional component.

As noted earlier, a captured gas return loop 140 may be added to return to an ozone generator 106, or to an optional oxygen concentrator or compressor 111, the excess ozone, chlorine, oxygen, or other gases released in separator tank or column 138 from fluid being treated. Loops for return of captured gases from a separator tank or column 138 may significantly enhance efficiency, particularly in those embodiments which employ oxygen concentrators 111 in conjunction with ozone generator 106. Use of a captured gas return loop 140 in such systems, particularly those employing pressure swing oxygen concentrators, may also increase concentration of argon in the feed gas mixture to the ozone generator, thereby providing an unobvious benefit which may improve overall efficiency and performance of corona discharge ozone generators by allowing corona discharges to be established and maintained with lower voltages between corona discharge electrodes. Captured gases may also be routed to a separate unit for further processing before release to outside air if required by environmental laws or local codes.

Note that the system configuration illustrated in FIG. 6 also includes a chlorine generation and mixing bypass loop 118. As explained earlier in conjunction with FIG. 6, bypass loop 118 begins at adaptable clamp 116, typically installed on pipe 96 between pump 94 and another adaptable clamp 100, and ends at an injection port to Venturi 102, also installed in adaptable clamp 100. Motive force for flow of fluid from pipe 96 through adaptable clamp 116 and loop 118 is provided by a pressure difference between a higher pressure in pipe 96 at adaptable clamp 116 and a lower pressure at an injector port of Venturi 102. Pressure at a Venturi injector port may be sufficiently low that an adaptable clamp for a beginning point for a chlorine generating bypass loop may also be installed between adaptable clamp 100 and filter 97 instead of the location between pump 94 and adaptable clamp 100 as illustrated for adaptable clamp 116. Fluid flow velocity through bypass loop 118 may also support use of a second Venturi device 102a in adaptable clamp 116 in order to permit introduction, through injector ports in Venturi 102a, of a gas mixture containing ozone from ozone generator 106a into fluid flowing through loop 118 prior to chlorine generator 120 so that the benefits, described earlier, of using dissolved and gaseous ozone to reduce or prevent buildup of calcium and other deposits on electrode plates in generator 120 may be realized. For embodiments where loop 118 fluid flow velocities do not support use of Venturi 102a, a different type of ozone injector may be used in loop 118 prior to generator 120. Examples of different types of ozone injector suitable for such use include diffusion injectors as illustrated in FIGS. 7a through 7d which use diffusion cylinders 141, plates or discs 142, or other forms of diffusers made of sintered metal or plastic particles, or cylinders 141, plates or discs 142, or other forms of diffusers made typically of metal, plastic, or ceramics through which very small diameter holes have been formed, as by a laser. Size, and compactness of sintering, of particles, or size of holes, may be adjusted to control size of bubbles created by a gas mixture containing ozone and/or chlorine which is forced by pressure through cylinders, plates or disks, or other forms of sintered or drilled material to be injected in a liquid flowing through injection devices. Diffusion cylinders, plates, or disks made of sintered 316 stainless steel particles of a size range from 5 to 30 microns have been found to work well. Gaskets 146 or other conventional means may be used for providing seals around inlets 144, 147 for liquid or gas, respectively, into container 143, and around an outlet 145 for a resulting mixture of liquid 445 and gas. A gas mixture (represented by dashed arrows) including ozone or another gas may be forced under pressure through gas inlets 147 and through such diffusers to create small bubbles in a fluid flowing (as represented by solid line arrows) through such devices. Injection devices such as illustrated in FIGS. 7a through 7d may be installed as an option to using a Venturi, such as Venturi 102a in FIG. 6. For example, in FIG. 6, Venturi 102a could be omitted and replaced by a rigid tube in adaptable clamp 116, and a diffusion injector 121 such as in FIG. 7a could be installed using flexible tubing and hose clamps in line 118 leading from bypass inlet, provided by adaptable clamp 116 to an inlet to a salt chlorine generator 120. A pressurized gas mixture containing ozone may also be provided by ozone resistant flexible tubing connected to gas inlet 147 in diffusion device 121. Gas mixtures being injected are generally under sufficient pressure to exceed pressure in liquid flowing through an injector and result in bubbles from gas that flows through sintered or drilled material. In FIG. 6, for an embodiment using injector 121, ozone generator 106a may be an ozone generator using ultraviolet light and pressure may be supplied by an air compressor, which may also operate jointly with a pressure swing oxygen concentrator 123. Ultraviolet light for production of ozone may be provided by mercury vapor discharge lamp or by other sources, such as ultraviolet light emitting diode, diode laser, or Vertical Cavity Surface Emitting Laser (VCSEL) capable of emitting ultraviolet light with wavelengths short enough (generally shorter than about 210 nanometers) to cause disassociation of diatomic oxygen molecules. Ozone generators 106a and 106 may also use Applicant's hybrid ultraviolet tube as described in Applicant's prior patents. Liquid that includes dissolved gases, such as ozone, as well as gas bubbles, may then be directed to an inlet of a chlorine generating electrolysis cell (e.g., cell 120 in FIG. 6) to obtain a benefit of preventing buildup of deposits on electrode plates as described earlier. Operation of chlorine generating device 120 is as explained earlier in conjunction with FIGS. 3, 3a, and 3b.

Figure 8:
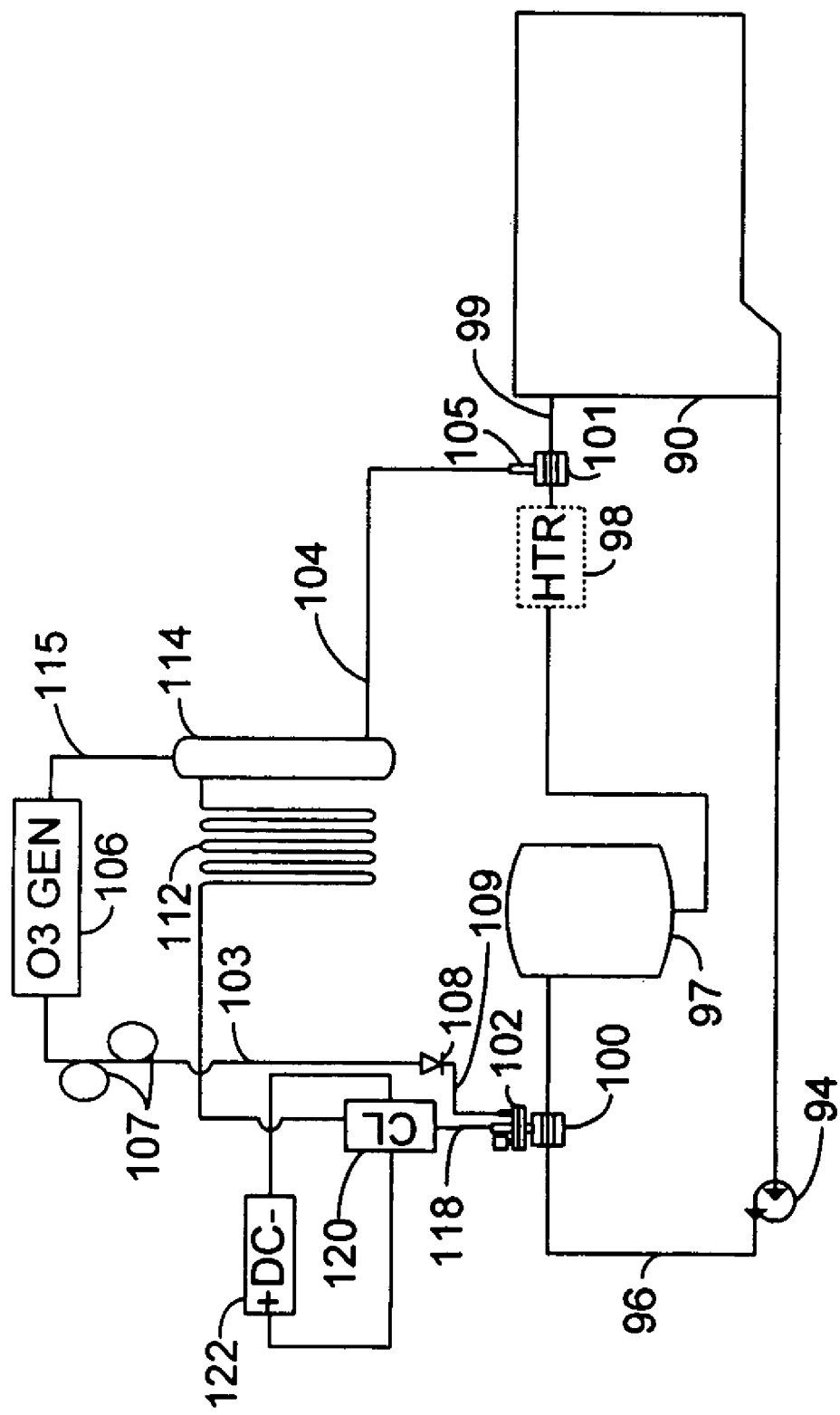
FIG. 8 is a schematic illustration of a water treatment installation showing use of adaptable clamps with chlorine generator in a forward bypass loop and ozone injection upstream of chlorine generator.

Referring now back to the discussion associated with FIGS. 5 and 6 describing how ozone could be injected into a solution stream flowing to an electrolysis cell to obtain benefits in reducing or eliminating buildup of deposits on electrode plates in an electrolysis cell, Applicant now discloses additional embodiments that exploit this benefit to a greater degree than illustrated in FIG. 5. FIG. 8, which is a modification of an embodiment illustrated in FIG. 5 and explained in conjunction therewith, employs a conventional electrolysis cell 120 which has been oriented for upward vertical flow of a solution containing a halogen salt and connected in series with the principal flow path through a forward bypass loop 104 which originates at adaptable clamp 100 and returns to main pool filter flow at adaptable clamp 101. A gas mixture containing ozone from ozone generator 106 is injected into bypass flow through an injection port on Venturi 102. Tubing connecting the outlet of Venturi 102 to an inlet of electrolysis cell 120 is preferably approximately 2 to 4 feet in length to provide adequate contact distance for a significant portion of ozone in the gas mixture to become absorbed into the solution flowing through the bypass. This embodiment provides benefits of mixing ozone with chlorine freed from solution in the electrolysis cell as well as the electrode plate deposit reducing effect of injecting ozone just upstream of an electrolysis cell.

Figure 9:
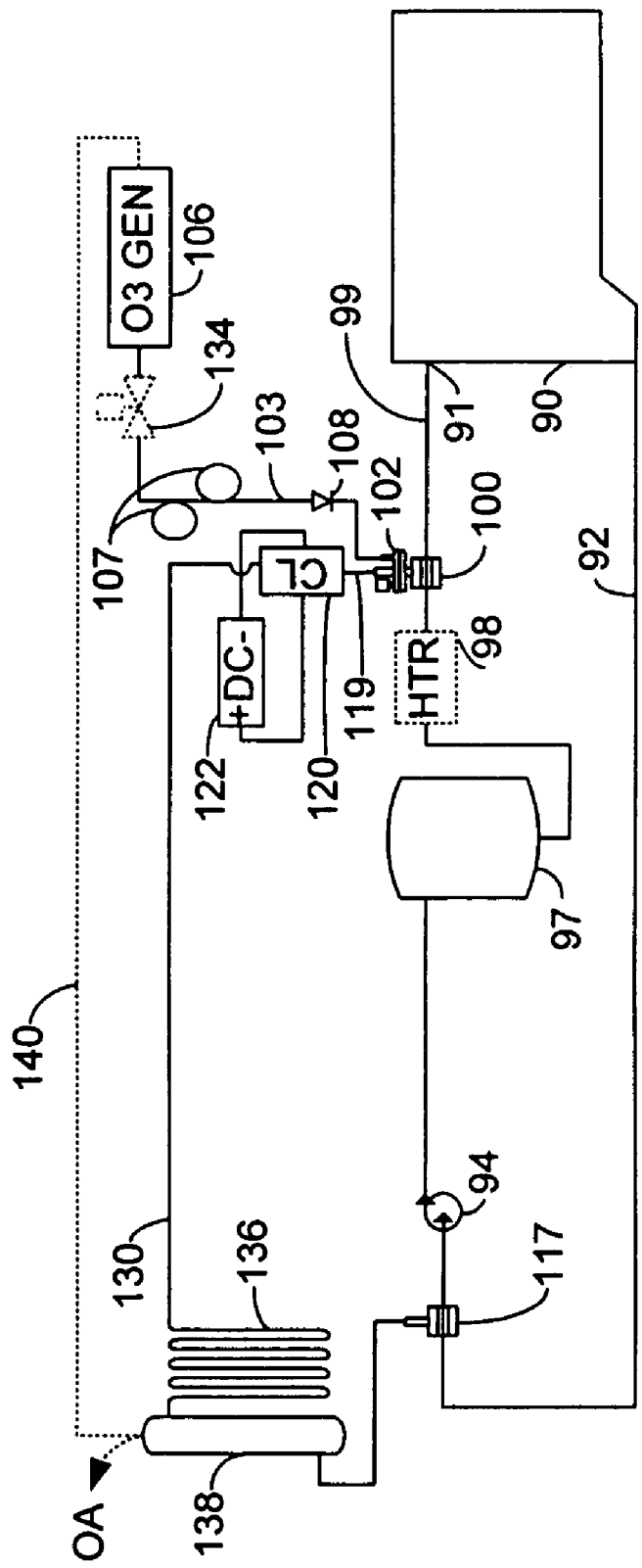
FIG. 9 is a schematic illustration of a water treatment installation showing use of adaptable clamps with chlorine generator in a reverse bypass loop with intake between filter and nozzles and with ozone injection upstream of chlorine generator.

FIG. 9, which illustrates a modified version of an embodiment illustrated in FIG. 6 and explained in conjunction therewith, shows a conventional electrolysis cell 120 oriented for upward vertical flow and placed in series in a reverse bypass loop that originates at adaptable clamp 100 and returns bypass flow to main pool filter flow at adaptable clamp 117. Note that this embodiment also illustrates an alternate intake location for loop 130 between filter 97 and main circulation loop return spray nozzles 91. Pressure in pipe 99 supplying spray nozzles 91 used in some pool installations will typically be sufficient to cause adequate flow in reverse bypass loop 130, and this embodiment provides ozone and chlorine injection after filter 97, with loop 130 return prior to filter 97, which may provide enhanced efficacy for some applications. A gas mixture containing ozone is injected into bypass flow via Venturi 102 and ozone is further mixed and absorbed in 2 to 4 feet of tubing 119 before being introduced into an inlet of electrolysis cell 120 to create benefits of controlling deposits on electrode plates as well as mixing of ozone with chlorine freed during electrolysis.

Figure 10:
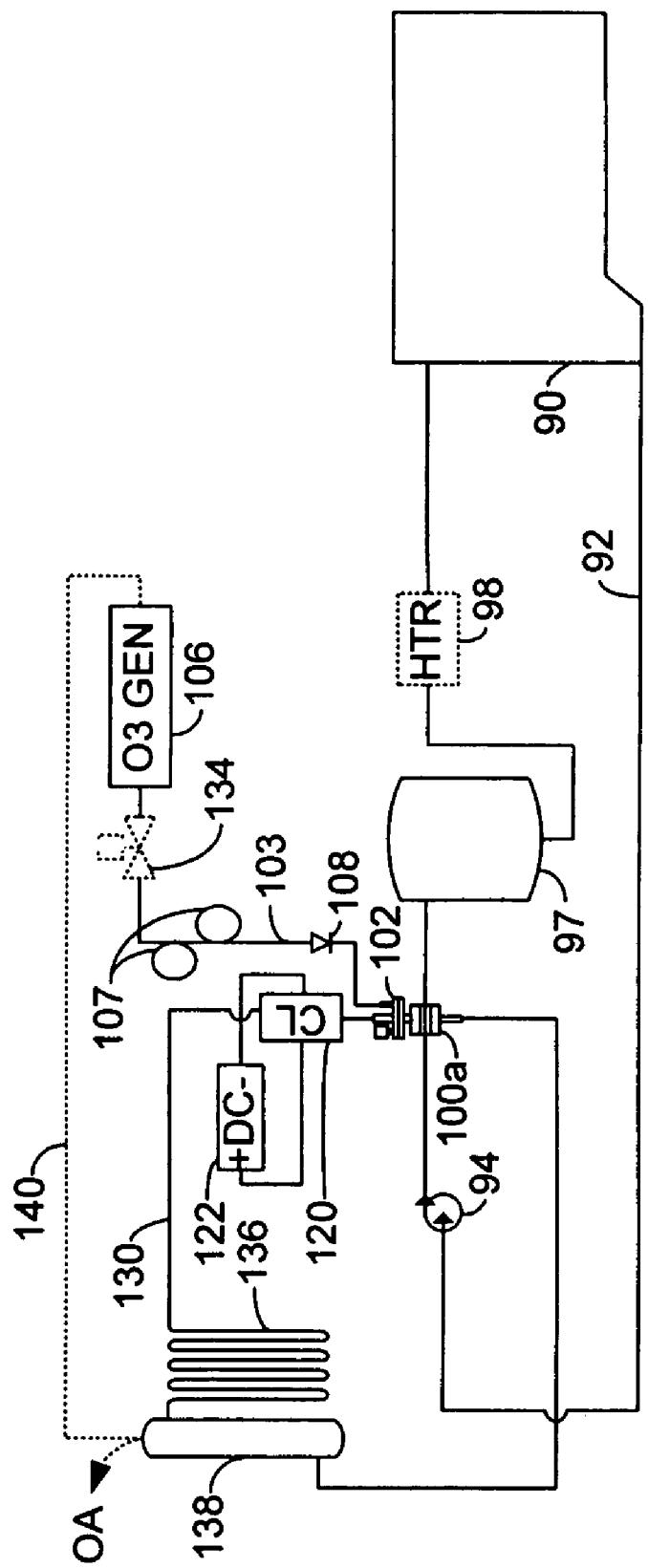
FIG. 10 is a schematic illustration of a water treatment illustration showing use of features of Applicant's adaptable clamp to install intake and return ports for a reverse bypass loop in a single clamp location.

FIG. 10 illustrates a modification of a system embodiment shown in FIG. 6 except that both intake and return connections of the bypass loop are made in the same adaptable clamp 100*a* using an embodiment of an adaptable clamp of the instant invention such as illustrated in FIG. 2*g* or FIG. 2*i*.

It should be noted that the deposit buildup reducing benefits of injecting ozone a short distance prior to an electrolysis cell may also be realized in a salt chlorine generation electrolysis cell conventionally installed in a main filter circulation loop. This may be done by orienting the electrolysis cell so that fluid flow through the electrolysis cell is generally vertically upward, and then injecting ozone into the fluid flowing in the main circulation loop flow shortly prior to such an electrolysis cell. With this construction, both dissolved ozone and bubbles containing ozone flow through the electrolysis cell. A Venturi or a different ozone injection device, for example such as illustrated in FIGS. 7*a* through 7*d*, may be used to inject ozone prior to the electrolysis cell.

Figure 11A:
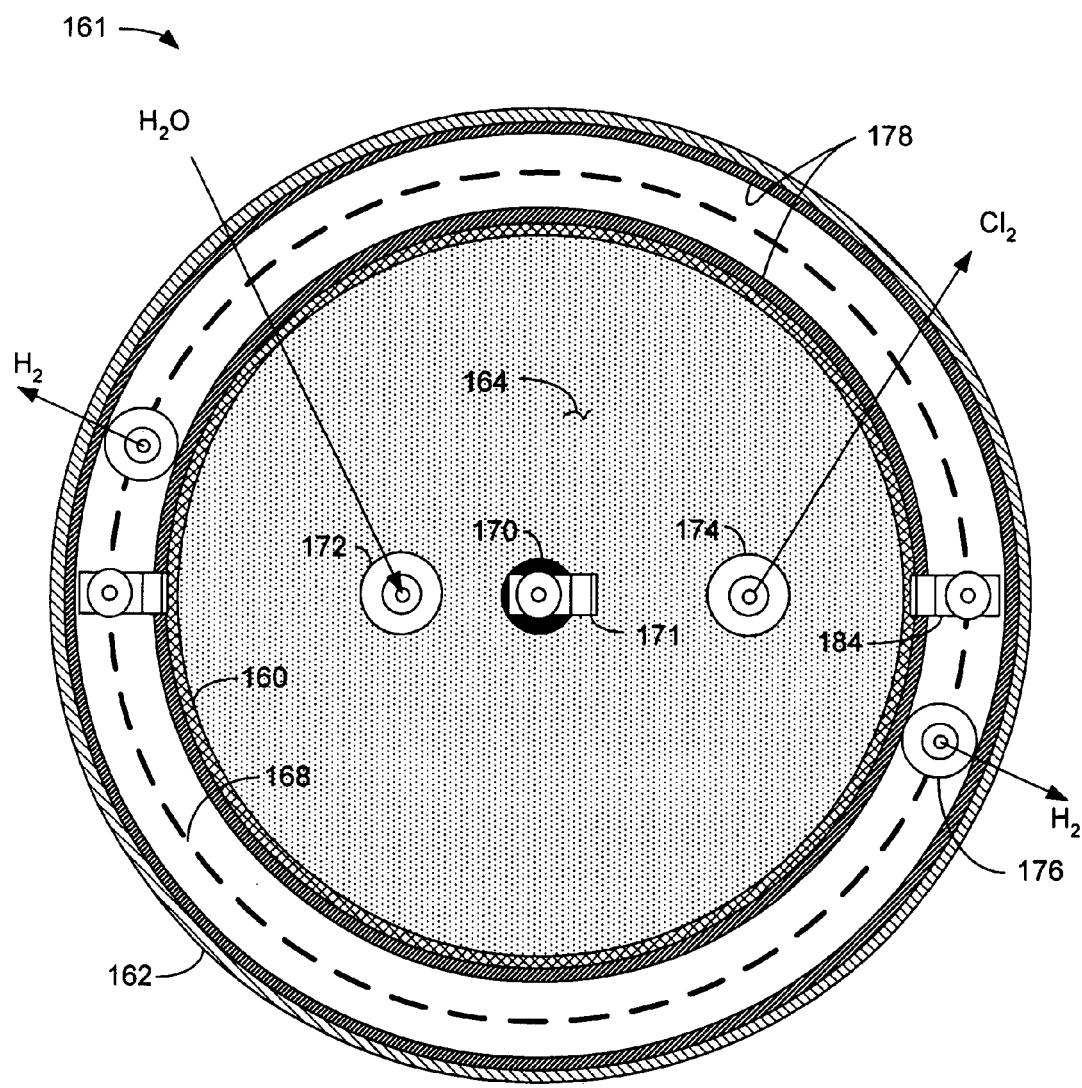
FIG. 11a provides a top-down view of one embodiment of a sealed chlorine generation module, showing representative locations of components.
Figure 11B:
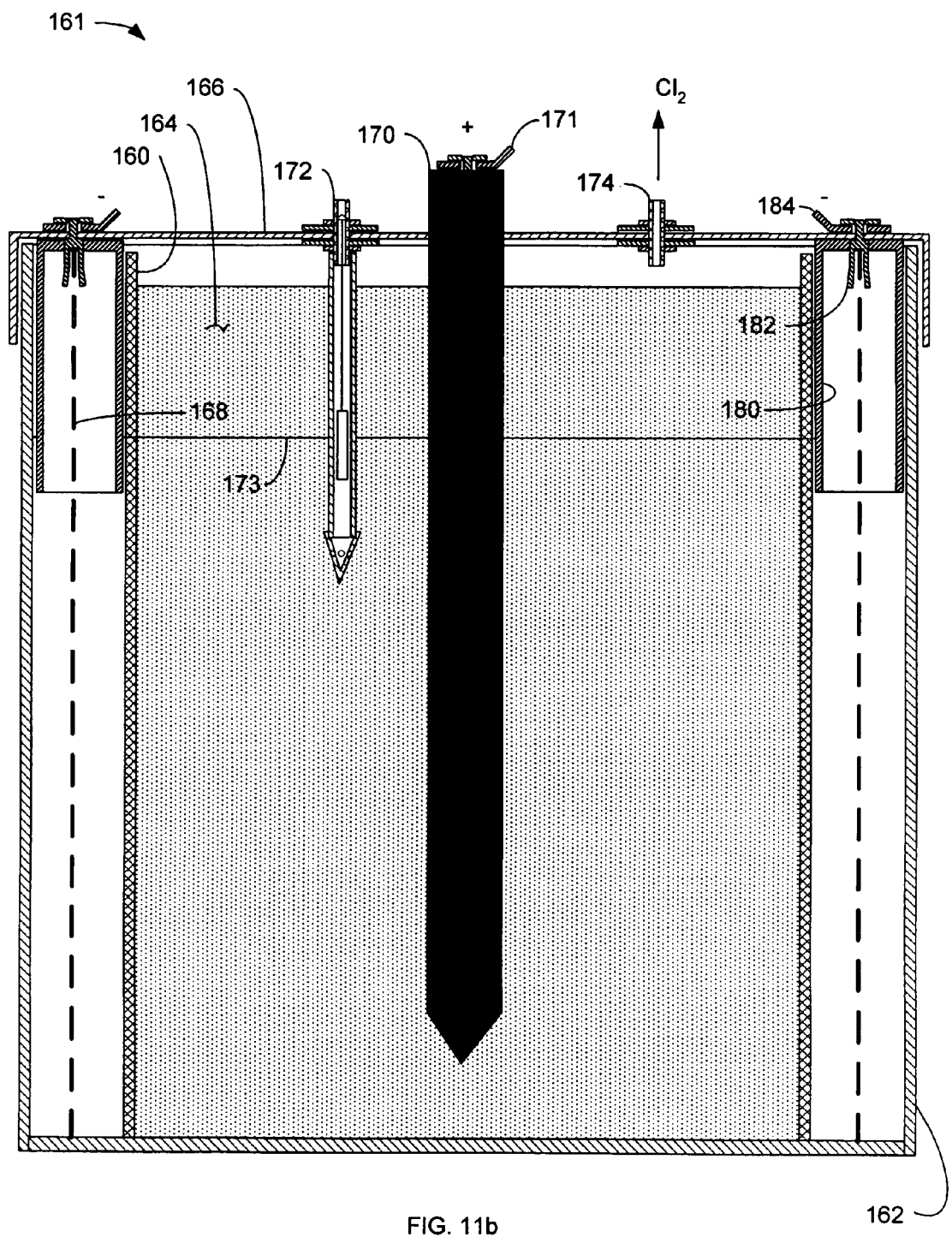

FIGS. 11*a* and 11*b* illustrate a novel and unobvious enhancement to conventional techniques for generation and use of chlorine in pools, spas, and other applications. FIGS. 11*a* and 11*b* provide top down and sectional views of a disposable, sealed chlorine generation module 161 that may be used to generate chlorine (or another halogen), when needed, for injection into water or another fluid being treated without a need to add salt to water in pool or spa, and without introduction or buildup of undesirable sodium hydroxide into pool or spa water.

FIG. 11*a* provides a top, cut away view of one embodiment of a sealed chlorine generation module, showing representative locations of components, and FIG. 11*b* provides a side, cut away view of the same embodiment. As shown, cylindrical membrane or screen 160, which may be made of a material that will allow passage of sodium ions and water, and which may also be perforated plastic or fabric or fine mesh netting, is lowered into a container 162 and allowed to rest on the bottom of container 162. Container 162 may be a plastic container similar to a five-gallon bucket commonly used for storage and transport of drywall compound. If a material selected for membrane or screen 160 is not self-supporting, vertical stays, which may be made of wood or plastic, and one or more rigid plastic rings, may be attached to or incorporated within membrane or screen 160 and used to maintain membrane 160 in a more-or-less cylindrical shape. Granular salt (NaCl) 164 may be added within a generally cylindrical volume formed by membrane or screen 160 and a bottom of container 162. Salt may be added before a lid 166 is affixed to container 162, or salt may be added through a sealable opening in lid 166 after lid is affixed to container 162. A conductive cylindrical shell 168 is added in a space between membrane or screen 160 and sides of container 162. Shell 168 may be made of a generally solid sheet of material having multiple openings to permit passage of a fluid, somewhat like an inner drum used in a residential clothes washing machine, or it may be made of a grid of wires or a woven fabric. Shell 168 may rest on a bottom of container 162 or may be suspended from fittings on lid 166. Shell 168 serves as an outer electrode to support electrolysis reactions within container 162 after assembly. Shell 168 may be fabricated of a conductive material that can also withstand corrosive effects of a brine solution and byproducts of an electrolytic reaction over an expected useful lifetime of a sealed chlorine generation module 161. A center electrode 170, which may be fabricated of graphite or another conductive material, is located near a center of container 162. A metallic connection terminal 171 may be secured in center electrode 170 to permit easy attachment of a lead from a power supply. Center electrode 170 may be supported from a bottom of container 162 or may be suspended from lid 166. A water addition device or feature 172 is included to permit addition of water to container 162 after lid 166 is affixed and sealed. Water addition device or feature 172 may be as simple as a sealable opening provided in a lid 166 or side of container 162, but may provide a capability, such as a float valve, to automatically maintain a desired level 173 of a solution within container 162 as water in container 162 is consumed in electrolytic and related reactions. A chlorine release device or feature 174 is provided to permit chlorine gas that escapes from a liquid solution in container 162 to be released from container 162 and routed through tubing to an intended application, such as an inlet port on a Venturi. Chlorine release device or feature 174 may be generally located near center electrode 170 since center electrode will generally be energized with a positive voltage when is it desired to generate chlorine gas, and chlorine gas will generally be released from a brine solution in container 162 near a positive electrode. Chlorine release device or feature 174 may be as simple as an opening wherein a plug containing a tube, such as commonly found in chemistry laboratories, could be inserted, but may also be an assembly which seals to lid 162 and provides a length of rigid tubing to which a separate, generally flexible tube, could be attached via use of a hose clamp, friction fitting, or quick disconnect fitting or other technique to route chlorine to an intended application. One or more hydrogen release devices or features 176 may be provided proximate or above the negative electrode to permit hydrogen gas resulting from electrolytic reactions to escape from container 162 and if necessary, be captured and routed to a desired application or release point. Such a hydrogen capture and isolation structure 178 may be in a form of a double walled cylinder wherein the double walls are joined at a top so that a sectional view through one side of the hydrogen capture and isolation structure 178 is generally in a shape of an inverted "U" as shown as item 180 in FIG. 11*b*. Hydrogen capture and isolation structure 178 is positioned within container 162 so that the sides of the hydrogen capture and isolation structure 178 are positioned between membrane or screen 160 and extend down below a maintained level 173 of solution. Hydrogen release devices or features 176 may be used to provide an opening or passageway through selected points in a top section of hydrogen capture and isolation structure as well as through lid 166 so that hydrogen gas released as a byproduct of an electrolytic reaction in a brine solution may be captured and routed as desired for further use or for safety purposes. For example, hydrogen may be routed to a device that may store hydrogen (e.g., by compression or by adsorption in selected materials) for subsequent use (e.g., as a heating fuel, or as a feed gas for a fuel cell). Alternately, hydrogen gas may simply be routed via a tube and released to the atmosphere in a manner and location that will not allow development of an explosive concentration. Conductive clips 182 may be used to provide a sealable penetration of lid 166 and to provide a conductive path from a connection terminal 184 to outer electrode shell 168. Lid 166 is made of a non-electrically-conductive material having sufficient thickness and strength to support electrodes or other devices which may be suspended from lid 166, and provide an airtight seal when affixed to container 162. In embodiments similar to that illustrated in FIGS. 11a and 11b, lid 166 may be lowered onto and adhesively bonded or plastic welded, or secured by clips, threads, or other devices, to a top of container 162 so as to provide an airtight seal between lid 166 and container 162. Pointed ends are illustrated in center electrode 170 and water addition device 172 to allow a lid 166 with these devices affixed to be lowered into container 162 after salt has been loaded into container 162. However, if it is desired to add salt after lid 166 is assembled to container 162, pointed ends would not be needed. If it were desired to implement lid 166 as a screw-on lid to be added after salt was loaded in container 162, then water addition device 172 may be located to a top of a side of container 162 to avoid resistance to screwing lid 166 onto container 162 containing salt.

A sealed chlorine generation module 161 such as described above could be used as a disposable source of chlorine gas which does not require addition of salt to pool or spa water and which does not add sodium hydroxide to pool or spa water.

Figure 12:
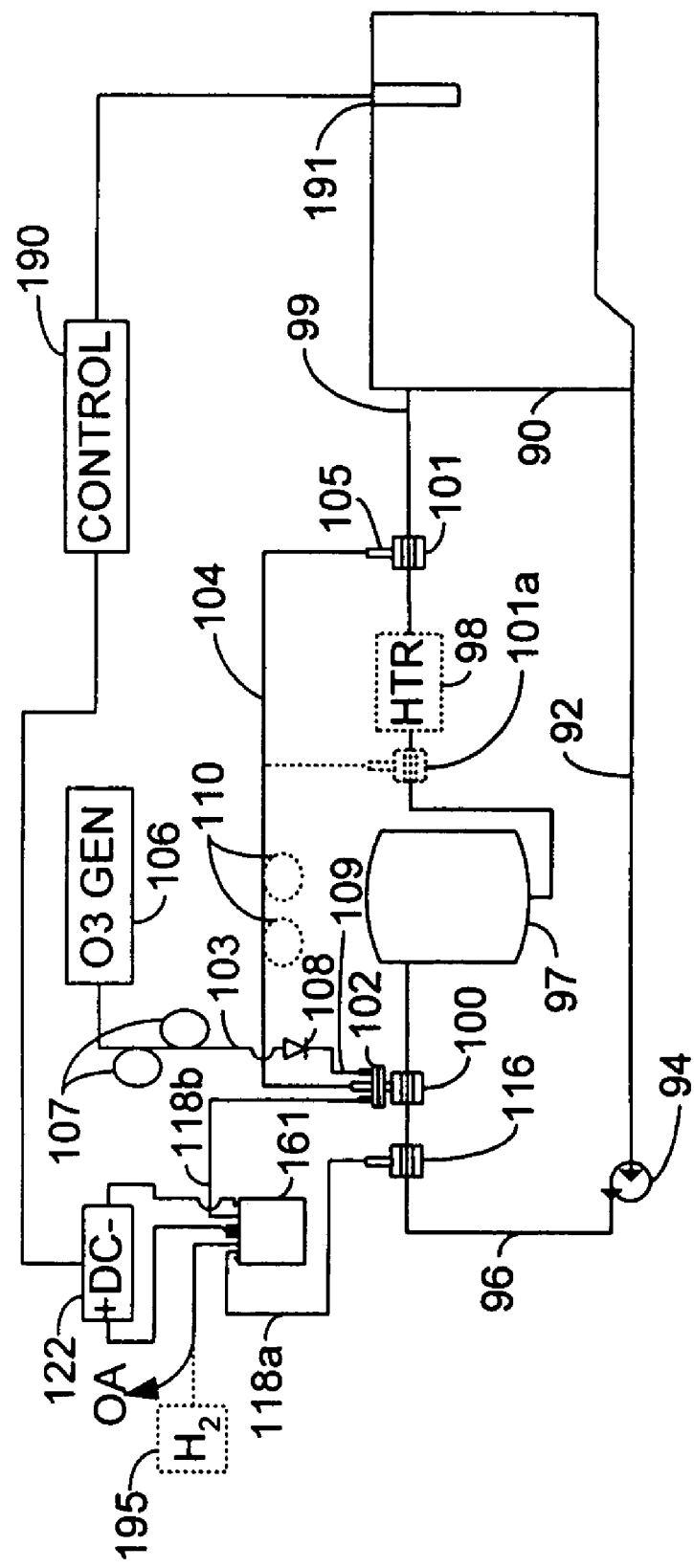
FIG. 12 is a schematic illustration of a water treatment installation showing use of a sealed chlorine generation module to provide chlorine for simultaneous injection with ozone in a forward bypass loop.

FIG. 12 illustrates a system configuration similar to that illustrated in FIG. 5, except that a sealed chlorine generation module 161 is used in FIG. 12 instead of a conventional chlorine generator 120 used in FIG. 5, and the nature and functional characteristics of tubing segments 118a and 118b are changed considerably from those described for bypass loop 118 in conjunction with FIG. 5. In the configuration of FIG. 12, segments 118a and 118b no longer comprise a bypass loop, as was illustrated in FIG. 5. In FIG. 5, fluid drawn from pipe 96 through adaptable clamp 116 flows through a conventional chlorine generator 120 and is injected as a water stream containing chlorine into bypass loop 104 through Venturi 102. Instead, in the configuration illustrated in FIG. 12 using Applicant's sealed, disposable chlorine generator module 161, tubing segment 118a is attached to water injection device 172 on module 161 and is used only to provide makeup water to replace water consumed by electrolytic related reactions in module 161. In an alternate embodiment, adaptable clamp 116 and loop segment 118a may be omitted and makeup water for module 161 may be provided by an alternate source of water, which may be distilled water. Tubing segment 118b is attached to chlorine release device 174 on module 161 and used to transport chlorine gas from module 161 to an injection port of Venturi 102, through which chlorine gas is injected in fluid flowing in bypass 104. Positive and negative leads from power supply 122 are connected to terminals 171 and 184, respectively, of module 161 (FIGS. 11a and 11b). Chlorine gas is generated in and released from module 161 only when module 161 is energized by power supply 122, which may be operated responsive to a control system 190 wherein sensors 191 are used to monitor chlorine or contaminant levels in a pool or spa, and power supply 122 is generally energized only when a control system 190 determines additional chlorine is needed. Hydrogen gas generated in module 161 may be routed to outside air (OA) or as stated optionally to a hydrogen storage apparatus 195. Any of several mechanisms (e.g., conductivity, specific gravity, optical index, weight, chlorine output) could be used to determine manually or automatically when the salt content in module 161 has been depleted, or saturation levels of NaOH or other compounds have been reached, and thus when a fresh module 161 should be installed in a water treatment system or other chemical treatment system.

Although the sealed module 161 described above was designed to support production of chlorine gas from common salt (NaCl), it could also be used with other metal halogen salts (e.g., NaBr, KBr, KCl) to generate chlorine or to generate other halogen gases, which may be desirable for some water treatment or other chemical process applications.

It should be evident that, with appropriate modifications as described above, sealed, disposable chlorine generation module 161 could be used in place of a conventional chlorine generator 120 in each of the other configurations described earlier herein that used a chlorine generator 120, as well as in numerous other applications involving water purification or other chemical processes needing chlorine.

A sealed chlorine generator module 161 of the instant invention, that provides chlorine without having to add salt (NaCl) to pool or spa water, makes practical another capability of particular value in treating water in spas and other applications. By adding sodium bromide (NaBr) or potassium bromide (KBr) to water in a spa instead of sodium chloride (NaCl), as in the example of FIG. 16, then the chlorine from module 161 injected into loop 104 at Venturi 102 will associate with sodium or potassium ions in the circulating water, freeing bromine to act as a disinfecting agent in the water. This approach avoids production of undesirable bromates that are typically formed when a sodium bromide solution in pool or spa water is allowed to flow through a conventional electrolysis cell as shown in FIG. 3.

There are many other possible embodiments of Applicant's invention that could be implemented based on concepts described herein that also fall fairly within the scope of the following appended claims, wherein I claim:

The invention claimed is:

1. A system for treating water in a swimming pool, spa, bathing, or other water holding reservoir connected to a main water circulation loop including a water pump and water filter for drawing said water from said water holding reservoir and returning filtered said water to said water holding reservoir, said system comprising:
   a bypass loop coupled to said main water circulation loop such that a portion of said water flowing through said main water circulation loop flows through said bypass loop and is returned to said main water circulation loop, said bypass loop including:
      a treatment chemical injection device for injecting a treatment chemical into said portion of said water flowing through said bypass loop, and,
      an electrolysis cell receiving water from said portion of said water flowing through said bypass loop, said electrolysis cell being energized by a power supply so that a halogen freed by electrolysis from a halogen salt dissolved in said water is made available to react with contaminants and/or other treatment chemicals in said water returned to said main water circulation loop, an ozone generator coupled to said treatment chemical injecting device for providing a gas mixture including ozone to said portion of said water flowing through said bypass loop.

2. The system of claim 1 wherein said electrolysis cell is positioned in said bypass loop so as to receive said water comprising said gas mixture including ozone.

3. The system of claim 2 further comprising a contact region between said treatment chemical injection device and said electrolysis cell to enhance contact of said ozone with contaminants and treatment chemicals in said water, said gas mixture including ozone being at least partially in the form of bubbles in said water flowing through said contact region and through said electrolysis cell.

4. The system of claim 3 further comprising
a second contactor section receiving said portion of said water that has passed through said electrolysis cell to provide thorough mixing and contact among treatment chemicals, water, and contaminants therein,
a separator tank to separate excess gases not absorbed in said portion of said water flowing through said bypass loop,
a passageway for returning said excess gases from said separator tank to said ozone generator for recirculation within said bypass loop.

5. The system of claim 1 wherein an intake end of said bypass loop is located to receive water from said main water circulation loop between a pressure side of said pump and said filter and a return end of said bypass loop is located after said filter.

6. The system of claim 1 wherein an intake end of said bypass loop is located to receive water from said main water circulation loop between a pressure side of said pump and said filter and a return end of said bypass loop is located to provide water to a suction side of said pump.

7. The system of claim 1 wherein said treatment chemical injection device includes a Venturi injector.

8. The system of claim 1 wherein said treatment chemical injection device includes a diffuser.

9. The system of claim 1 wherein at least one end of said bypass loop is coupled to said main water circulation loop using an adaptable saddle clamp assembly for connecting tubing in communicating relation with an opening in a pipe conveying said main water circulation loop wherein said adaptable saddle clamp assembly is configurable to fit different diameters of said pipe, said adaptable saddle clamp assembly comprising:
a first clamping member having an inner diameter generally matching a largest outer diameter of said different diameters of said pipe fittable by said adaptable saddle clamp, said first clamping member having an opening generally coaxial with said opening in said pipe,
a second clamping member having an inner diameter corresponding to a diameter of said first clamping member, said first clamping member and said second clamping member being engagable together in clamped relation about said pipe,
a first resilient member fitted within said opening in said first clamping member and having an opening through which a first said tubing extends, with material of said first clamping member about said opening in said first clamping member configured to receive said resilient member so that when said adaptable saddle clamp assembly is tightened about said pipe, said first resilient member is compressed to sealably engage said first tubing with said opening in said pipe,
one or more first shims, each of which having a smaller, different inner diameter for each accommodating a one of said different diameters of said pipe and fittable within said first clamping member, each of said one or more first shims having an opening therein so that said first rigid tubing may communicate with said first opening in said pipe,
one or more second shims fittable within said second clamping member to each accommodate a one of said different diameters of said pipe,
whereby when said adaptable saddle clamp assembly is to be installed on said largest diameter of said different diameters of said pipe, said first clamping member and said second clamping member are used without said one or more first shims and said one or more second shims to accommodate said largest diameter of said pipe and when said adaptable saddle clamp assembly is to be installed on a one of said different diameters of said pipe a matching said one or more of said first shims and said one or more of said second shims are fitted in said first clamping member and said second clamping member, respectively, to allow said adaptable saddle clamp assembly to accommodate said different diameter of said pipe.

10. The system of claim 9 wherein both an intake connection and a return connection to said main water circulation loop are made using said adaptable saddle clamp assembly wherein said pipe has a second opening, and said second clamping member has an opening therein generally coaxial with said second opening in said pipe, and further comprising a second resilient member fitted in said opening in said second clamping member with material of said second clamping member about said opening therein configured to receive said second resilient member, said second resilient member having an opening therein receiving a second tubing so that when said adaptable saddle clamp is tightened about said pipe, said second resilient member is compressed to sealably engage said second tubing with second opening in said pipe, and wherein said one or more second shims also has an opening therein so that said second tubing may communicate with said second opening in said pipe when said adaptable saddle clamp assembly is used on one of said different diameters of said pipe.

11. A system for treating water in a swimming pool, spa, bathing, or other water holding reservoir having a main water circulation loop including a water pump and water filter for drawing water from said water holding reservoir and returning filtered said water to said water holding reservoir, said water including a halogen salt dissolved therein, said system comprising:
a first bypass loop coupled to said main water circulation loop such that a first portion of said water flowing through said main water circulation loop flows through said first bypass loop and is returned to said main water circulation loop, said first bypass loop including:
a first treatment chemical injecting device for injecting a treatment chemical into said first portion of said water flowing through said first bypass loop, and,
a contactor section receiving said first portion of said water from said first treatment chemical injecting device to provide enhanced mixing of treatment chemicals with said first portion of said water and contaminants therein, a second bypass loop receiving a second portion of said water flowing through said main water circulation loop, said second bypass loop including:

a second treatment chemical injection device for injecting a second treatment chemical into said second portion of said water flowing through said second bypass loop, an electrolysis cell receiving said second portion of said water from said second treatment chemical injection device, said electrolysis cell providing a halogen from said halogen salt dissolved in said second portion of said water to react with contaminants and/or other treatment chemicals in said water flowing through said second bypass loop, said second portion of water in said second bypass loop delivered to an injection port on said first treatment chemical injection device in said first bypass loop, mixing said second portion of said water with said first portion of said water flowing in said first bypass loop, at least one ozone generator coupled to an injection port on said first treatment chemical injecting device and/or to an injection port on said second treatment chemical injection device and providing a gas mixture including ozone thereto.

12. The system for treating water of claim 11, said first bypass loop further comprising:

a separator tank receiving water from said contactor section to allow excess gases from said gas mixture not absorbed in said first portion of said water flowing through said first bypass loop to escape therefrom before said first portion of said water is returned to said main water circulation loop.

13. The system of claim 12 further comprising:

an oxygen concentrator coupled to an inlet of said at least one ozone generator, and a passageway for returning said excess gases from said separator tank to said oxygen concentrator and/or said ozone generator for re-injection within said first bypass loop.

14. The system of claim 11 wherein at least one end of said first bypass loop or said second bypass loop is coupled to said main water circulation loop using an adaptable clamp assembly for connecting tubing in communicating relation with an opening in a pipe conveying said main water circulation loop wherein said adaptable saddle clamp assembly is configurable to fit different diameters of said pipe, said adaptable saddle clamp assembly comprising:

a first clamping member having an inner diameter generally matching a largest outer diameter of said different diameters of said pipe fittable by said adaptable saddle clamp, said first clamping member having an opening generally coaxial with said opening in said pipe, a second clamping member having an inner diameter corresponding to a diameter of said first clamping member, said first clamping member and said second clamping member being engagable together in clamped relation about said pipe, a first resilient member fitted within said opening in said first clamping member and having an opening through which a first said tubing extends, with material of said first clamping member about said opening in said first clamping member configured to receive said resilient member so that when said adaptable saddle clamp assembly is tightened about said pipe, said first resilient member is compressed to sealably engage said first tubing with said opening in said pipe, one or more first shims, each of which having a smaller, different inner diameter for each accommodating a one of said different diameters of said pipe and fittable within said first clamping member, each of said one or more first shims having an opening therein so that said first rigid tubing may communicate with said first opening in said pipe, one or more second shims fittable within said second clamping member to each accommodate a one of said different diameters of said pipe, whereby when said adaptable saddle clamp assembly is to be installed on said largest diameter of said different diameters of said pipe, said first clamping member and said second clamping member are used without said one or more first shims and said one or more second shims to accommodate said largest diameter of said pipe and when said adaptable saddle clamp assembly is to be installed on a one of said different diameters of said pipe a matching said one or more of said first shims and said one or more of said second shims are fitted in said first clamping member and said second clamping member, respectively, to allow said adaptable saddle clamp assembly to accommodate said different diameter of said pipe.

15. A system as set forth in claim 11 wherein said first treatment chemical and said second treatment chemical are the same chemical.

* * * * *